United States Patent
Nagato et al.

(10) Patent No.: US 7,285,144 B2
(45) Date of Patent: Oct. 23, 2007

(54) FLUIDIZED-BED GASIFICATION AND COMBUSTION FURNACE

(75) Inventors: Shuichi Nagato, Tokyo (JP); Takahiro Oshita, Tokyo (JP); Norihisa Miyoshi, Tokyo (JP); Seiichiro Toyoda, Tokyo (JP); Shugo Hosoda, Tokyo (JP); Nobutaka Kashima, Tokyo (JP); Katsutoshi Naruse, Tokyo (JP)

(73) Assignee: Ebara Corporation, Tokyo (JP)

( * ) Notice: Subject to any disclaimer, the term of this patent is extended or adjusted under 35 U.S.C. 154(b) by 45 days.

(21) Appl. No.: 11/210,798

(22) Filed: Aug. 25, 2005

(65) Prior Publication Data

US 2006/0000143 A1    Jan. 5, 2006

Related U.S. Application Data

(63) Continuation of application No. 09/530,703, filed as application No. PCT/JP97/04011 on Nov. 4, 1997.

(51) Int. Cl.
*C01B 3/32* (2006.01)

(52) U.S. Cl. .................. 48/198.6; 48/197 R; 48/127.1; 48/127.3; 48/127.5; 48/198.1; 48/198.8

(58) Field of Classification Search ............... None
See application file for complete search history.

(56) References Cited

U.S. PATENT DOCUMENTS

| | | | |
|---|---|---|---|
| 4,274,941 | A | 6/1981 | Janssen et al. |
| 4,833,877 | A | 5/1989 | Ahland et al. |
| 4,917,028 | A | 4/1990 | Ganster et al. |
| 5,156,099 | A | 10/1992 | Ohshita et al. |
| 5,313,913 | A | 5/1994 | Ohshita et al. |
| 5,365,889 | A | 11/1994 | Tang |
| 5,513,599 | A | 5/1996 | Nagato et al. |
| 5,922,090 | A | 7/1999 | Fujimura et al. |
| 6,139,805 | A | 10/2000 | Nagato et al. |

FOREIGN PATENT DOCUMENTS

| | | |
|---|---|---|
| EP | 0 030 152 | 6/1981 |
| EP | 0 117 634 | 9/1984 |

(Continued)

*Primary Examiner*—Glenn Caldarola
*Assistant Examiner*—Vinit Patel
(74) *Attorney, Agent, or Firm*—Wenderoth, Lind & Ponack, L.L.P.

(57) ABSTRACT

A gasification furnace and a combustion furnace are integrated with each other to form a single fluidized-bed gasification and combustion furnace in which unburned char generated in the gasification furnace is combusted in the combustion furnace, and the thus generated heat of combustion is utilized as a heat source for gasification. The fluidized-bed gasification and combustion furnace (1) comprises a gasification furnace (3) and a combustion furnace (4) which are divided by a first partition wall (2). In the gasification furnace (3), a revolving flow of the fluidized medium is formed by diffusion devices (32, 33) provided on furnace bottoms, and an upward flow of the fluidized medium partly flows in the combustion furnace (4). The combustion furnace (4) is divided into a main partition wall (5). In the main combustion chamber (6), a revolving flow of the fluidized medium is formed by diffusion devices (34, 35) provided on furnace bottoms, and an upward flow of the fluidized medium partly flows in the heat recovery chamber (7).

5 Claims, 16 Drawing Sheets

FOREIGN PATENT DOCUMENTS

| | | |
|---|---|---|
| EP | 0 312 840 | 4/1989 |
| EP | 0 619 455 | 10/1994 |
| EP | 776962 A2 | 6/1997 |
| JP | 51-19379 | 2/1976 |
| JP | 53-30480 | 3/1978 |
| JP | 54-100402 | 8/1979 |
| JP | 57-73076 | 5/1982 |
| JP | 57-209994 | 12/1982 |
| JP | 60-1285 | 1/1985 |
| JP | 60-1286 | 1/1985 |
| JP | 1-95208 | 4/1989 |
| JP | 2-147692 | 6/1990 |
| JP | 5-106807 | 4/1993 |
| JP | 6-317306 | 11/1994 |
| JP | 7-248194 | 9/1995 |
| JP | 7-269828 | 10/1995 |
| JP | 7-109282 | 11/1995 |
| JP | 7-301411 | 11/1995 |
| JP | 7-332614 | 12/1995 |
| JP | 10-089640 | 4/1998 |

F I G. 3
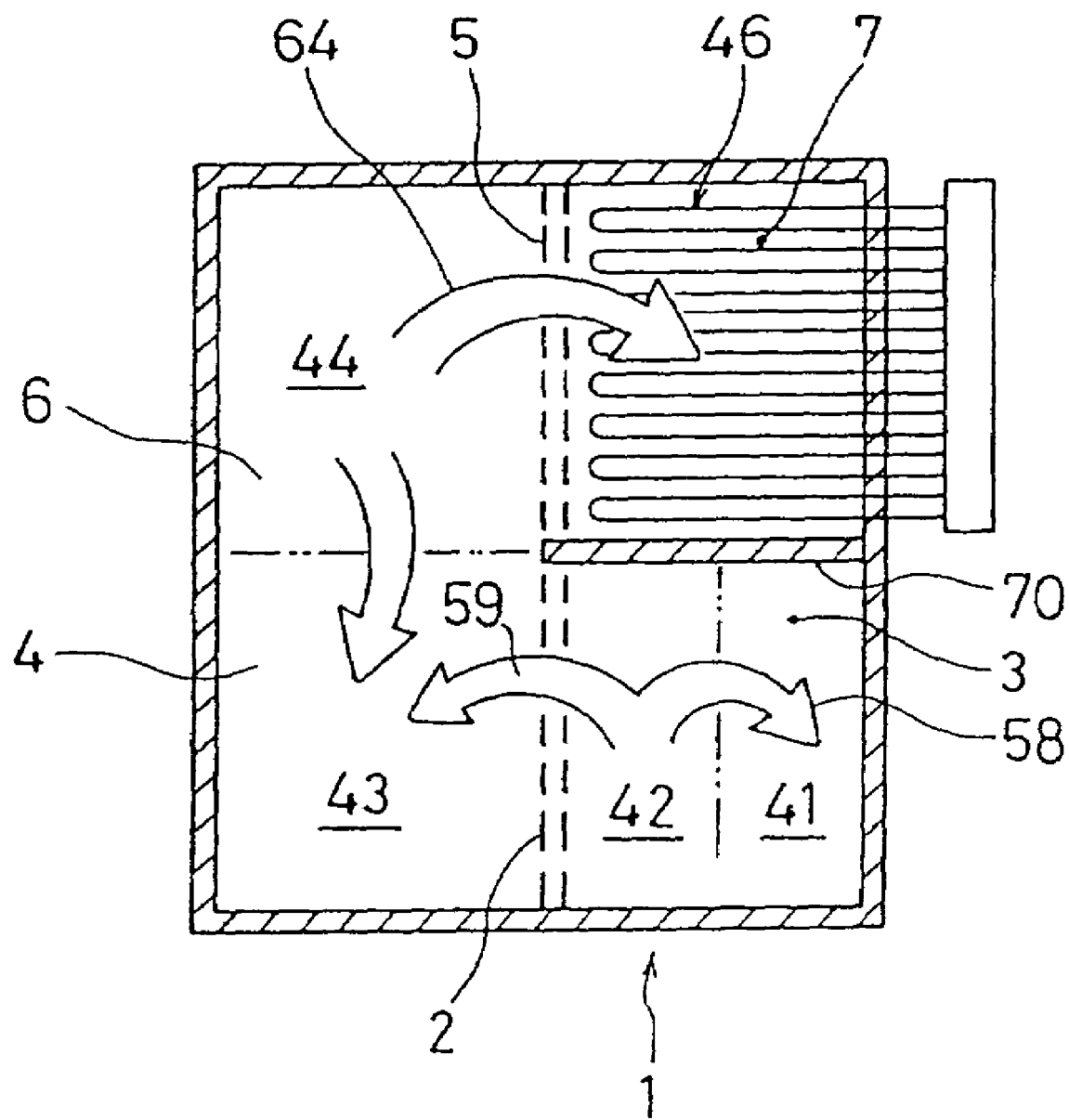

FLUIDIZED-BED GASIFICATION AND COMBUSTION FURNACE

This application is a continuation application of U.S. application Ser. No. 09/530,703, filed May 4, 2000 now abandoned, which is a national stage application of International application No. PCT/JP97/04011, filed Nov. 4, 1997, now pending.

TECHNICAL FIELD

The present invention relates to a fluidized-bed gasification and combustion furnace which integrates a fluidized-bed gasification furnace and a fluidized-bed combustion furnace into a single structure.

BACKGROUND ART

Efforts for generating electricity at a high efficiency using coal have been made. As one of the efforts, there has been proposed a topping-cycle system which incorporates a pressurized fluidized-bed combustion furnace as shown in FIG. 14. In this system, coal is first gasified in a fluidized-bed gasification furnace 501. At this time, combustible components composed mainly of carbon (i.e., the so-called char produced in the gasification furnace 501) is combusted in a char combustion furnace 502 different from the gasification furnace 501. That is, a mixture of gas and char generated in the gasification furnace 501 is introduced into a cyclone 505 in which gas and char are separated from each other, and the char is supplied to the char combustion furnace 502 and the gas is supplied to a combustor 503. On the other hand, a fluidized medium and the char are supplied from the gasification furnace 501 to the char combustion furnace 502 in which the char is combusted to heat the fluidized medium, and the heated fluidized medium is returned to the gasification furnace 501. Combustible gas produced in the gasification furnace 501 and combustion exhaust gas generated in the char combustion furnace 502 are mixed with each other and combusted in the combustor 503 to raise the temperature, and then the exhaust gas is introduced into a gas turbine 504. Further, combustion exhaust gas and ashes generated in the char combustion furnace 502 are separated from each other in a cyclone 506, and as described above, the combustion exhaust gas is introduced into the combustor 503 and the ashes are discharged from the bottom of the cyclone.

Steam generated in the char combustion furnace 502 is introduced into a steam turbine 508, and then heated in a waste heat boiler 509, and then returned to the char combustion furnace 502. The combustion exhaust gas discharged from the gas turbine 504 is discharged from a stack 511 via the waste heat boiler 509.

As the temperature of gas at the inlet of the gas turbine is high, the efficiency of the gas turbine is high. Hence, in order to raise the efficiency of the total system, it is very important to keep the gas at the inlet of the gas turbine at a high temperature.

On the other hand, gasification performance is influenced by the kind of coal used. In general, as the reaction temperature is high, the reaction of gasification is accelerated, and the rate of gasification is increased. Therefore, in order to use various kinds of coal as fuel, it is extremely important to keep the temperature of the gasification furnace stable and high.

The methods for maintaining the temperature of the gasification furnace are roughly classified into two methods. One method is that a part of the fuel supplied to the gasification furnace is not gasified but combusted, and the other method is that char produced in the gasification furnace is supplied into the char combustion furnace together with the fluidized medium, for combusting thereby heating the fluidized medium, and the heated fluidized medium is returned to the gasification furnace. Generally, the combustion reaction rate of gas is much faster than the combustion reaction rate of solid as different order. Therefore, in the former case, most of the oxygen supplied to the gasification furnace reacts with gas component generated therein, and hence the yield of gas is lowered. In the latter case, since gas produced in the gasification furnace is not consumed for maintaining the temperature in the furnace, the yield of gas is high and available coal range is wide.

However, the latter method requires a technology for circulating a large amount of heating medium having a high temperature from the gasification furnace to the char combustion furnace. However, this requires a handling technology for particles having a high temperature and containing unburned substances, so that this encounters technically difficult problems. The reason why the topping-cycle system incorporating the pressurized fluidized-bed combustion furnace has not been put to practical use yet is that the technology for handling the particles having a high temperature and containing unburned substances has not been developed.

On the other hand, there has been proposed an attempt in which the char combustion furnace and the gasification furnace are disposed adjacent to each other to shorten conveyance distance of particles having a high temperature therebetween. In this technology, the char combustion furnace is provided adjacent to the gasification furnace, and immersed heat transfer tubes are disposed in the bed of the char combustion furnace.

As shown in FIG. 15, the heat transfer coefficient between the heat transfer tube in the fluidized-bed and the heating medium is almost constant irrespective of degree of fluidization of the fluidized medium, if the superficial velocity of fluidizing gas is two times larger than the velocity required for minimum fluidization of the fluidized medium. That is, the immersed heat transfer tubes in the fluidized-bed can collect a constant quantity of heat, regardless of the superficial velocity. Therefore, if the quantity of heat generated in the fluidized-bed is changed (for example, the amount of coal supplied to the furnace is changed according to load change), the temperature of the fluidized-bed is changed since the amount of heat transfer is constant.

In the topping-cycle system incorporating the pressurized fluidized-bed combustion furnace, it is important to keep the gas at the outlet of the gasification furnace and the gas at the outlet of the combustion furnace at desired high temperatures, respectively. In such a structure in which the char combustion furnace and the gasification furnace are disposed adjacent to each other, since the fluidized medium is circulated between the char combustion furnace and the gasification furnace, both of the furnaces have a relationship to each other, and hence the fluctuation of each bed temperature may cause fatal damage to a stable operation of the whole system.

As a method for suppressing the fluctuation of bed temperature in the char combustion furnace incorporating the immersed heat transfer tubes, the amount of oxygen in the fluidizing gas supplied to the char combustion furnace is changed in accordance with the load, whereby the amount of char to be combusted is changed for thereby controlling the bed temperature.

However, control of the amount of char to be combusted by controlling the amount of oxygen has a slow response speed, stable control is difficult, and the bed temperature runs out of control. As a result, there is a probability that the fluidized medium and ashes are melted and the fluidized-bed cannot be maintained, resulting in stoppage of the operation.

In order to keep the gasification furnace at a high temperature, it is necessary that the heating medium is heated by combusting char in the char combustion furnace and the heated heating medium having a high temperature is supplied to the gasification furnace, and hence the bed temperature of the char combustion furnace must be high. However, if the bed temperature of the char combustion furnace is excessively high, then clinker is formed. Therefore, it is necessary that the bed temperature is controlled within a designated range and the char combustion furnace has an excellent controllability of the bed temperature.

The easiest method for controlling the temperature of the char combustion chamber is supplying heating medium having a low temperature when the temperature of the char combustion chamber is increased. For example, the amount of fluidized medium required for lowering the bed temperature from 950° C. to 900° C. by 50° C., though depending on the temperature of the fluidized medium supplied, in a case where the temperature of the fluidized medium supplied thereto is 400° C., may be 50/(900-400)=1/10 of the total amount of the fluidized medium. Conversely, if the bed temperature is decreased to a value lower than a set value, since the bed temperature is recovered by combusting char, there is nothing to do.

Therefore, if there is such a method for supplying the fluidized medium having a low temperature to the char combustion furnace, when necessary, while observing change of the bed temperature of the combustion furnace, then temperature control of the char combustion furnace can be easily achieved. In this case, it is important to discharge the fluidized medium from the char combustion furnace, equal to the amount of fluidized medium supplied thereto.

On the other hand, conventionally, in an atmospheric fluidized-bed boiler, coal is combusted in the fluidized-bed, and heat is recovered from the heated fluidized medium and combustion exhaust gas. FIG. 16 is a schematic view showing an example of a conventional atmospheric fluidized-bed boiler. The fluidized-bed boiler comprises a combustion furnace 601 and a heat recovery chamber 602 which are partitioned from each other by a partition wall 600. Heat transfer surfaces 603 for heat recovery from the fluidized medium are provided in the heat recovery chamber 602, and heat transfer surfaces 604 for heat recovery from combustion gas are provided in the freeboard. Steam produced by heat recovery through the heat transfer surfaces 603 and 604 drives a steam turbine 605.

Since coal characteristics are affected by the kind of coal, the combustion rate in the fluidized-bed is different, and the rate of the collected heat from the fluidized medium to the collected heat from combustion gas is different depending on the kind of coal.

Therefore, the proper arrangement of the heat transfer surfaces for heat recovery from the fluidized medium and the heat transfer surfaces for heat recovery from combustion gas is different depending on the kind of coal. Conventionally, the arrangement of the heat transfer surfaces in the boiler has heretofore been changed with every kind of coal. Therefore, there is a great limitation to change the kind of coal without reconstruction of the boiler, and if the kind of coal is greatly changed, the reconstruction of the boiler has been unavoidably conducted. This is because excessive heat transfer surfaces relative to the amount of heat recovery lead to lowering the furnace temperature, causing poor combustion and deteriorating the environment by combustion gas. Conversely, shortage of the heat transfer surfaces leads to raising the furnace temperature and causing clinker formation due to melting of ashes or agglomeration due to aggregation of the fluidized medium.

SUMMARY OF THE INVENTION

In order to solve the above problems, it is an object of the present invention to provide a fluidized-bed gasification and combustion furnace in which a combustion furnace to be separately installed is not required, and a gasification furnace and a combustion furnace are integrated with each other. Hence, a space necessary for its installation becomes small, and even if fuel generates a large amount of char like coal, the amount of char to be transferred can be easily controlled, and there is no clogging trouble in the pipes. In addition, a fluidized-bed gasification and combustion furnace is provided in which char can be combusted in a simple facility, combustion heat of char can be utilized as a heat source for gasification, and the bed temperature in the combustion furnace can be easily and accurately controlled. In addition, a fluidized-bed gasification and combustion furnace is provided in which clinker is not formed, and even if fuel contains incombustible material having an irregular shape, such fuel can be used and thus a variety of fuel can be utilized, and high efficiency can be obtained, and the amount of harmful material discharged from the furnace is extremely small to allow the furnace to be suitable for environmental conservation.

Further, another object of the present invention is to provide a fluidized-bed gasification and combustion furnace which is a fluidized-bed coal boiler which can use various kinds of coal without changing the arrangement of the heat transfer surfaces in the boiler, i.e. reconstruction of the boiler.

In order to achieve the above object, according to a first aspect of the present invention, there is provided a fluidized-bed gasification and combustion furnace, characterized in that: a fluidized-bed furnace is divided by a plurality of partition walls into a gasification furnace, a main combustion chamber of a combustion furnace and a heat recovery chamber of the combustion chamber; a revolving flow of a fluidized medium is formed in at least one of the gasification furnace and the main combustion chamber; a circulating flow of the fluidized medium is formed between the gasification furnace and the main combustion chamber; a circulating flow of the fluidized medium is formed between the heat recovery chamber and the main combustion chamber; and a heat transfer surface is disposed in a fluidized-bed of the heat recovery chamber.

The present invention is characterized by a single fluidized-bed furnace in which a gasification chamber, a char combustion chamber and a heat recovery chamber which are functionally characterized are separated by respective partition walls, and the char combustion chamber and the gasification chamber, and char combustion chamber and the heat recovery chamber are disposed adjacent to each other, respectively.

In the heat recovery chamber, immersed heat transfer tubes are disposed to cool a fluidized medium in the heat recovery chamber at all times. A partition wall between the heat recovery chamber and the char combustion chamber is a vertical wall, and the upper end of the partition wall extends to a position near an upper surface of the fluidized-bed and an opening is provided in the vicinity of the furnace bottom. In the char combustion furnace near the partition wall, an intense fluidizing region in which a fluidized medium is intensely blown upwards is formed, and the fluidized medium, which has been blown upwards, partly enters the heat recovery chamber. In a case where the temperature of the char combustion chamber is raised to a value higher than a set value, the descending velocity of the fluidized medium in the heat recovery chamber is increased, and the amount of fluidized medium which has been cooled and flows in the char combustion chamber through an opening near the furnace bottom is increased for thereby lowering the temperature of the char combustion chamber quickly.

Further, thermal energy recovered by cooling the fluidized medium in the heat recovery chamber is recovered as steam which drives a steam turbine, and hence the recovered thermal energy can be effectively utilized.

Further, according to a second aspect of the present invention, there is provided a fluidized-bed gasification and combustion furnace, characterized in that: a fluidized-bed furnace is divided by a first partition wall into a gasification furnace and a combustion furnace; the first partition wall has openings so that the gasification furnace and the combustion furnace communicate with each other at lower portions thereof, and upper portions thereof near surfaces of fluidized-beds; a diffusion device is provided on a furnace bottom of the gasification furnace so as to have different fluidizing velocities in the fluidized-bed; an intense fluidizing region of the fluidized medium is formed so as to have a substantially high fluidizing velocity in the fluidized-bed in a region near the first partition wall, thus generating an upward flow of the fluidized medium; a weak fluidizing region of the fluidized medium is formed so as to have a substantially low fluidizing velocity in the fluidized-bed in a region apart from the first partition wall, thus generating a descending flow of the fluidized medium, and combustible material is supplied to said weak fluidizing region; the upward flow of the fluidized medium in the intense fluidizing region becomes partly a flow directed to the weak fluidizing region in the vicinity of a surface of the fluidized-bed, thus forming a revolving flow in the fluidized-bed in the gasification furnace, and partly a branched flow flowing in the combustion furnace through said upper opening of said first partition wall; the combustion furnace formed by the first partition wall has a fluidized-bed portion which is divided by a second partition wall into a main combustion chamber and a heat recovery chamber; the second partition wall has a lower opening through which the main combustion chamber and the heat recovery chamber communicate with each other, an upper end of the second partition wall extends to a position near a surface of the fluidized-bed, and the main combustion chamber and the heat recovery chamber are integrated with each other in a freeboard section; a diffusion device is provided on a furnace bottom of the main combustion chamber so as to have different fluidizing velocities in a fluidized-bed in the main combustion chamber; a weak fluidizing region of the fluidized-bed is formed so as to have a substantially low fluidizing velocity in the fluidized-bed in a region near the first partition wall, and an intense fluidizing region is formed so as to have a substantially high fluidizing velocity in the fluidized-bed in a region near the second partition wall; a descending flow of the fluidized medium is generated in the weak fluidizing region, and the descending flow is partly returned to the gasification furnace through the lower opening of the first partition wall, thus forming a circulating flow between the gasification furnace and the main combustion chamber; an upward flow of the fluidized medium is generated in the intense fluidizing region, and the upward flow becomes partly a flow directed to the weak fluidizing region at a side of the first partition wall for thereby creating a revolving flow in the fluidized-bed of the main combustion chamber, and partly a branched flow which enters the heat recovery chamber beyond the second partition wall; a diffusion device is provided on a furnace bottom of the heat recovery chamber so as to have a substantially low fluidizing velocity in a fluidized-bed in the heat recovery chamber, thus forming a weak fluidizing region of the fluidized medium; and thus the fluidized medium which has entered the heat recovery chamber from the main combustion chamber beyond the second partition wall descends in the heat recovery chamber, and returns to the main combustion chamber through the lower opening of the second partition wall, thus forming a circulating flow; and a heat transfer surface is disposed in the fluidized-bed in the heat recovery chamber.

The present invention according to the second aspect offers the following advantages.

(1) Since the interior of a fluidized-bed furnace is divided by a first partition wall into a gasification furnace and a combustion furnace, gasification and combustion are separated from each other, and two functions can be operated independently from each other at the same time, in spite of a single fluidized-bed furnace.

The first partition wall has openings so that the gasification furnace and the combustion furnace communicate with each other at upper portions thereof near surfaces of fluidized-beds, and lower portions thereof. In the gasification furnace, a diffusion device is provided on a furnace bottom of the gasification furnace so as to have different fluidizing velocities in a fluidized-bed, an intense fluidizing region of the fluidized medium is formed so as to have a substantially high fluidizing velocity in the fluidized-bed in a region near the first partition wall, thus generating an upward flow of the fluidized medium, and a weak fluidizing region of the fluidized medium is formed so as to have a substantially low fluidizing velocity in the fluidized-bed located at the other side, thus generating a descending flow of the fluidized medium. As a result, a revolving flow is formed in the fluidized-bed, and the fluidized medium in the upward flow in the intense fluidizing region partly forms a branched flow flowing in the combustion furnace through the upper opening of the first partition wall.

Thus, by supplying combustible material to the weak fluidizing region, the combustible material is swallowed into the descending flow, and is then uniformly distributed and mixed with the fluidized medium by the revolving flow, and gasified by partial combustion during sufficient retention time. Char which is difficult to be gasified is introduced into the combustion furnace by the branched flow.

On the other hand, in the combustion furnace formed at the opposite side of the first partition wall, a second partition wall is further provided in the fluidized-bed for thereby dividing the fluidized-bed portion into a main combustion chamber and a heat recovery chamber. The second partition wall has a lower opening through which the main combustion chamber and the heat recovery chamber communicate with each other, and the upper end of the second partition wall extends to a position near the surface of the fluidized-bed, and the main combustion chamber and the heat recovery chamber are integrated with each other in the freeboard section. In the main combustion chamber, a diffusion device is provided on a furnace bottom so as to have different fluidizing velocities in the fluidized-bed, and a weak fluidizing region of the fluidized medium is formed so as to have a substantially low fluidizing velocity in the fluidized-bed in a region near the opening for communicating with the gasification furnace, thus generating a descending flow of the fluidized medium, and an intense fluidizing region of the fluidized medium is formed so as to have a substantially high fluidizing velocity in the fluidized-bed at the side of the second partition wall, i.e. the heat recovery chamber, thus generating an upward flow of the fluidized medium As a result, the upward flow of the fluidized medium becomes partly a flow directed to the weak fluidizing region, thus forming a revolving flow in the fluidized-bed in the main combustion chamber, and partly a flow which enters the heat recovery chamber beyond the second partition wall. Therefore, unburned char from the gasification furnace is swallowed into the descending flow in the combustion chamber, and is then uniformly distributed and mixed with the fluidized medium by the revolving flow, and completely combusted during sufficient retention time. Further, by supplying secondary air to the freeboard, combustion and desulfurizing reaction can be completed.

On the other hand, the quantity of heat generated in the combustion furnace returns partly to the gasification furnace by the fluidized medium having a high temperature passing through the lower opening of the first partition wall, thus contributing to a heat source for gasification. Further, the quantity of heat generated in the combustion furnace flows in the heat recovery chamber by the fluidized medium having a high temperature which enters the heat recovery chamber beyond the second partition wall.

In the heat recovery chamber, a weak fluidizing region is formed so as to have a substantially low fluidizing velocity in the fluidized-bed by providing a diffusion device on a furnace bottom, whereby a circulating flow is provided in which the fluidized medium having a high temperature which has entered the heat recovery chamber beyond the second partition wall from the main combustion chamber descends in the heat recover chamber, and returns to the main combustion chamber through the lower opening of the second partition wall, and collection of heat is performed by the heat transfer surfaces disposed in the fluidized-bed in the heat recovery chamber.

Since the heat recovery chamber has a weak fluidizing region of the fluidized medium, the immersed heat transfer tubes do not have an effect of wearing. Hence, it is possible to use silica sand as a fluidized medium, the amount of limestone used may be a minimum amount required for a desulfurizing reaction, and the amount of ashes discharged therefrom may be decreased for thereby allowing the furnace to be suitable for environmental conservation. Further, in the gasification furnace and the combustion furnace, gasification and combustion are operated at a temperature ranging from 650 to 950° C.

(2) Even if combustible material supplied to the furnace contains incombustible material having an irregular shape, the direction of revolving flow in the fluidized-bed and the direction of discharging incombustible material are the same direction, and the furnace bottom is inclined toward the incombustible material discharging port. Therefore, incombustible material can be easily discharged.

(3) The first partition wall and the second partition wall have an inclined surface, respectively, which is inclined toward the intense fluidizing region side and contributes to formation of a revolving flow by causing the upward flow to turn its direction. Further, the first partition wall and the second partition wall have a vertical surface in the weak fluidizing region side, and a descending flow is smoothly formed without stagnation of the fluidized medium.

(4) The produced gas from the gasification furnace and the combustion exhaust gas from the combustion furnace are introduced into the slagging combustion furnace and mixed therein, and combustible gas and particles containing combustible content are combusted at a high temperature of 1200° C. or higher for thereby melting ashes. Therefore, it is possible to decompose harmful gas components at a high temperature, reduce volume of ashes by melting, and prevent heavy metals from being eluted out.

(5) According to the present invention, the fluidized-bed gasification and combustion furnace has a pressure-tight structure or is housed in a pressure vessel, and is operated under a pressure equal to or higher than atmospheric pressure. The gases discharged therefrom are dedusted respectively, and then introduced into a gas turbine. Hence, the gas turbine can be operated at a temperature of 1300° C. or higher at the inlet of the gas turbine, and the efficiency of power generation can be greatly improved.

Fuel is supplied to the gasification furnace, gasified by partial combustion, and unburned char generated in the gasification furnace and accompanied by the produced gas is cooled to a temperature of 600° C. or lower in a gas cooling apparatus at the subsequent stage. Therefore, alkali metal such as Na or K which will cause hot corrosion of gas turbine blades, for example, is solidified or deposited onto surfaces of particles, and the solidified particles or the deposited particles are collected by a dust collector and introduced into the combustion furnace, and then completely combusted in the combustion furnace.

Further, the combustion exhaust gas discharged from the combustion furnace passes through the pressure vessel, and is cooled to a temperature of 600° C. or lower in the gas cooling apparatus at the subsequent stage. By this cooling, alkali metal such as Na or K is solidified or deposited onto surfaces of particles, and the solidified particles or the deposited particles are collected by a dust collector and discharged therefrom.

The combustion gas which has been purified by removing Na or K which will cause hot corrosion, and the produced gas which has been purified by removing dust with the dust collector downstream of the gasification furnace are introduced into the gas turbine, and combusted at a high temperature of 1300° C. or higher, thereby driving the gas turbine at a high efficiency. The gas turbine drives a compressor and a generator.

On the other hand, in case of using coal as fuel, a desulfurizing reaction is carried out in the furnace by mixing fuel with limestone or supplying the limestone separately to the furnace. That is, hydrogen sulfide $H_2S$ generated in the gasification furnace reacts with CaO to produce CaS by the desulfurizing reaction, and the produced CaS accompanied by the produced gas is supplied to a dust collector, and then CaS is collected in the dust collector and supplied to the main combustion chamber. Further, the fluidized medium containing unburned char and CaS is introduced in the main combustion chamber by a branched flow passing through the opening at the upper portion of the first partition wall of the gasification furnace. The unburned char is completely combusted in an oxidizing atmosphere in the main combustion chamber, while CaS is converted into $CaSO_4$, and the converted $CaSO_4$ accompanied by combustion exhaust gas is supplied to the dust collector. In the dust collector, $CaSO_4$ is collected and discharged therefrom.

According to a third aspect of the present invention, there is provided a fluidized-bed gasification and combustion furnace, characterized in that: a fluidized-bed furnace is divided by a first partition wall into a gasification furnace and a combustion furnace; the first partition wall has openings so that the gasification furnace and the combustion furnace communicate with each other at lower portions thereof, and upper portions thereof near surfaces of fluidized-beds; in the gasification furnace, a diffusion device is provided on a furnace bottom of the gasification furnace so as to have different fluidizing velocities in the fluidized-bed; an intense fluidizing region of the fluidized medium is formed so as to have a substantially high fluidizing velocity in the fluidized-bed in a region near the first partition wall, thus generating an upward flow of the fluidized medium; a weak fluidizing region of the fluidized medium is formed so as to have a substantially low fluidizing velocity in the fluidized-bed in a region apart from the first partition wall, thus generating a descending flow of the fluidized medium, and combustible material is supplied to the weak fluidizing region; the upward flow of the fluidized medium in the intense fluidizing region partly becomes a flow directed to the weak fluidizing region in the vicinity of a surface of the fluidized-bed, thus forming a revolving flow in the fluidized-bed in the gasification furnace, and partly becomes a branched flow flowing in the combustion furnace through the upper opening of the first partition wall; in the combustion furnace, a diffusion device is provided on a furnace bottom of the main combustion chamber so as to have different fluidizing velocities in a fluidized-bed; a weak fluidizing region of the fluidized medium is formed so as to have a substantially low fluidizing velocity in the fluidized-bed in a region near the first partition wall, thus generating a descending flow of the fluidized medium, and an intense fluidizing region of the fluidized medium is formed so as to have a substantially high fluidizing velocity in the fluidized-bed in a region apart from the first partition wall, thus generating an upward flow of the fluidized medium, whereby a revolving flow is formed in the fluidized-bed. Thus, the fluidized medium which has entered the gasification furnace from the combustion furnace through the upper opening of the first partition wall descends in the fluidized-bed by the revolving flow in the combustion furnace, and char which is an ungasified component is combusted while it is descending, and the fluidized medium heated to a high temperature returns partly to the gasification furnace in the vicinity of the furnace bottom through the lower opening of the first partition wall to serve as a heat source for pyrolysis gasification in the gasification furnace.

According to the third aspect of the present invention, in the gasification furnace, a diffusion device is provided on a furnace bottom of the gasification furnace so as to have different fluidizing velocities in a fluidized-bed, an intense fluidizing region of the fluidized medium is formed so as to have a substantially high fluidizing velocity in the fluidized-bed in a region near the first partition wall, thus generating an upward flow of the fluidized medium, and a weak fluidizing region of the fluidized medium is formed so as to have a substantially low fluidizing velocity in the fluidized-bed located at the other side, thus generating a descending flow of the fluidized medium. As a result, a revolving flow is formed in the fluidized-bed, and the fluidized medium in the upward flow in the intense fluidizing region partly forms a branched flow flowing in the combustion furnace through the upper opening of the first partition wall.

Thus, by supplying combustible material to the weak fluidizing region, the combustible material is swallowed into the descending flow, and then uniformly distributed and mixed with the fluidized medium by the revolving flow, and gasified by partial combustion during sufficient retention time. Char which is difficult to be gasified is introduced into the combustion furnace by the branched flow.

On the other hand, in the combustion furnace formed at the opposite side of the first partition wall, a diffusion device is provided on a furnace bottom of the combustion furnace so as to have different fluidizing velocities in a fluidized-bed, a weak fluidizing region of the fluidized medium is formed so as to have a substantially low fluidizing velocity in the fluidized-bed in a region near the first partition wall, thus generating a descending flow of the fluidized medium, and an intense fluidizing region of the fluidized medium is formed so as to have a substantially high fluidizing velocity in the fluidized-bed in a region apart from the first partition wall, thus generating an upward flow of the fluidized medium. As a result, the upward flow partly becomes a flow directed to the weak fluidizing region, thus generating a revolving flow of the fluidized medium in the fluidized-bed in the combustion furnace. The fluidized medium which has entered the combustion furnace through the upper opening of the partition wall from the gasification furnace descends in the combustion furnace with the revolving flow, and char which is an ungasified component is combusted while it is descending, and the fluidized medium heated to a high temperature returns to the gasification furnace through the lower opening of the partition wall in the vicinity of the furnace bottom for thereby serving as a heat source for pyrolysis gasification in the gasification furnace.

In order to perform pyrolysis gasification of fuel, thermal energy is required, and in the case of gasification of coal, thermal energy obtained by combustion of coal is normally utilized. In such a case, in order to improve the rate of gasification and suppress generation of tar, a high temperature is necessary, and hence coal which should be converted into gas as much as possible is combusted uselessly.

According to the third aspect of the present invention, as described above, the heat of combustion of char which is an ungasified component is returned to the gasification furnace with the fluidized medium having a high temperature, and hence coal can be saved without being combusted in an amount corresponding to the quantity of heat brought in the gasification furnace. As a result, the amount of air supplied to the furnace can be reduced, the rate of gasification can be improved, and the heating value of gas per unit volume can be increased.

Further, according to a fourth aspect of the present invention, there is provided a fluidized-bed gasification and combustion furnace, characterized in that: a fluidized-bed furnace is divided by a first concentric partition wall into a cylindrical gasification furnace and an annular combustion furnace formed around the gasification furnace; the first partition wall has openings so that the gasification furnace and the combustion furnace communicate with each other at upper portions thereof near surfaces of fluidized-beds, and lower portions thereof; a diffusion device is provided on a furnace bottom of the cylindrical gasification furnace enclosed by the first partition wall so as to have different fluidizing velocities in the fluidized-bed; a weak fluidizing region of the fluidized medium is formed so as to have a substantially low fluidizing velocity in a cylindrical area of a fluidized-bed at a central portion of the furnace, thus generating a descending flow of the fluidized medium; an intense fluidizing region of the fluidized medium is formed so as to have a substantially high fluidizing velocity in an annular area of the fluidized-bed in a region near the first partition wall, thus generating an upward flow of the fluidized medium; the upward flow of the fluidized medium partly flows in the combustion furnace through the upper opening of the first partition wall and partly flows toward the central weak fluidizing region, thus forming a revolving flow in the fluidized-bed of the gasification furnace, and combustible material is supplied to the weak fluidizing region; the annular combustion furnace outside of the first partition wall has a fluidized-bed portion which is divided by providing a second partition wall in a radial direction into a plurality of main combustion chambers and a plurality of heat recovery chambers; the second partition wall has a lower opening through which the main combustion chamber and the heat recovery chamber communicate with each other, an upper end of the second partition wall extends to a position near a surface of the fluidized-bed, and the main combustion chamber and the heat recovery chamber are integrated with each other in a freeboard section; in the main combustion chamber, a diffusion device is provided on a furnace bottom so as to have different fluidizing velocities in the fluidized bed; a weak fluidizing region of the fluidized medium is formed so as to have a substantially low fluidizing velocity in the fluidized-bed, near the opening for communicating with the gasification furnace, in a central part of the main combustion chamber, thus generating a descending flow of the fluidized medium, the descending flow partly returns to the gasification furnace through the lower opening of the first partition wall, and partly flows toward an intense fluidizing region formed so as to have a substantially high fluidizing velocity, and then the fluidized medium forms an upward flow in the intense fluidizing region, thus forming a revolving flow in the fluidized-bed in the main combustion chamber, and the upward flow partly forms a branched flow flowing in the heat recovery chamber beyond the second partition wall; a diffusion device is provided on a furnace bottom of the heat recovery chamber so as to have a substantially low fluidizing velocity in the fluidized-bed, thus forming a weak fluidizing region of the fluidized medium; and the fluidized medium which has entered the heat recovery chamber from the main combustion chamber beyond the second partition wall descends in the heat recovery chamber, and returns to the main combustion chamber through the lower opening of the second partition wall, thus forming a circulating flow; and a heat transfer surface is disposed in the fluidized-bed in the heat recovery chamber.

According to the fourth aspect of the present invention, since the interior of a fluidized-bed furnace is divided by a concentric first partition wall into a cylindrical gasification furnace and an annular combustion furnace surrounding the gasification furnace, gasification and combustion are separated from each other, and the two functions can operate independently from each other at the same time, in spite of a single fluidized-bed furnace.

The first partition wall has openings so that the cylindrical gasification furnace and the annular combustion furnace communicate with each other at upper portions thereof near surfaces of fluidized-beds, and lower portions thereof. In the cylindrical gasification furnace enclosed by the first partition wall, a diffusion device is provided on a furnace bottom of the gasification furnace so as to have different fluidizing velocities in a fluidized-bed, a weak fluidizing region of the fluidized medium is formed so as to have a substantially low fluidizing velocity in the fluidized-bed in a cylindrical region near the central portion of the furnace, thus generating a descending flow of the fluidized medium, and an intense fluidizing region of the fluidized medium is formed so as to have a substantially high fluidizing velocity in the fluidized-bed in an annular region near the first partition wall, thus generating an upward flow of the fluidized medium. As a result, a revolving flow is formed in the fluidized-bed, and the fluidized medium partly forms a branched flow flowing in the combustion furnace through the upper opening of the first partition wall.

Thus, by supplying combustible material to the weak fluidizing region, the combustible material is swallowed into the descending flow, and then uniformly distributed and mixed with the fluidized medium by the revolving flow, and gasified by partial combustion during sufficient retention time. Char which is difficult to be gasified is introduced into the combustion furnace by the branched flow.

On the other hand, in the annular combustion furnace outside of the first partition wall, a second partition wall is provided in the fluidized-bed in a radial direction for thereby dividing the fluidized-bed portion into a plurality of main combustion chambers and a plurality of heat recovery chambers. The second partition wall has a lower opening through which the main combustion chamber and the heat recovery chamber communicate with each other, and the upper end of the second partition wall extends to a position near the surface of the fluidized-bed, and the main combustion chamber and the heat recovery chamber are integrated with each other in the freeboard section. In the main combustion chamber, a diffusion device is provided on a furnace bottom so as to have different fluidizing velocities in the fluidized-bed. A weak fluidizing region of the fluidized medium is formed so as to have a substantially low fluidizing velocity in the fluidized-bed in a central region of the main combustion furnace near the opening for communicating with the gasification furnace, thus generating a descending flow of the fluidized medium, and an intense fluidizing region of the fluidized medium is formed so as to have a substantially high fluidizing velocity in the fluidized-bed at the side of the second partition wall (i.e., the heat recovery chamber) thus generating an upward flow of the fluidized medium. The upward flow of the fluidized medium partly becomes a flow directed to the weak fluidizing region, thus forming a revolving flow in the fluidized-bed in the main combustion chamber, and partly becomes a flow which enters the heat recovery chamber beyond the second partition wall. As a result, unburned char from the gasification furnace is swallowed into the descending flow in the combustion chamber, and is then uniformly distributed and mixed with the fluidized medium by the revolving flow, and completely combusted during sufficient retention time. Further, by supplying secondary air to the freeboard, combustion and desulfurizing reaction can be completed.

On the other hand, the quantity of heat generated in the combustion furnace returns partly to the gasification furnace by the fluidized medium having a high temperature which passes through the lower opening of the first partition wall, thus contributing to a heat source for gasification. Further, the quantity of heat generated in the combustion furnace flows in the heat recovery chamber by the fluidized medium having a high temperature which enters the heat recovery chamber beyond the second partition wall.

In the heat recovery chamber, a weak fluidizing region is formed so as to have a substantially low fluidizing velocity in the fluidized-bed by proving a diffusion device on a furnace bottom, whereby there is provided a circulating flow in which the fluidized medium having a high temperature which has entered the heat recovery chamber beyond the second partition wall from the main combustion chamber descends in the heat recover chamber, and returns to the main combustion chamber through the lower opening of the second partition wall, and collection of heat is performed by the heat transfer surfaces disposed in the fluidized-bed in the heat recovery chamber.

Since the heat recovery chamber has a weak fluidizing region of the fluidized medium, the immersed heat transfer tubes do not have an effect of wearing. Hence, it is possible to use silica sand as a fluidized medium, the amount of limestone used may be a minimum amount required for desulfurizing reaction, and the amount of ashes discharged therefrom may be decreased for thereby allowing the furnace to be suitable for environmental conservation. Further, in the gasification furnace and the combustion furnace, gasification and combustion are performed at a temperature ranging from 650 to 950° C.

In the fourth aspect of the present invention, the effects enumerated in (2) to (5) of the second aspect can also be obtained.

According to a fifth aspect of the present invention, there is provided a fluidized-bed gasification and combustion furnace, characterized in that: a fluidized-bed furnace is divided by a first concentric partition wall into a cylindrical gasification furnace and an annular combustion furnace surrounding the gasification furnace; the first partition wall has openings so that the gasification furnace and the combustion furnace communicate with each other at upper portions thereof near surfaces of fluidized-beds, and lower portions thereof; a diffusion device is provided on a furnace bottom of the cylindrical gasification furnace enclosed by the first partition wall so as to have different fluidizing velocities in the fluidized-bed; a weak fluidizing region of the fluidized medium is formed so as to have a substantially low fluidizing velocity in a cylindrical area of a fluidized-bed at a central portion of the furnace, thus generating a descending flow of the fluidized medium; an intense fluidizing region of the fluidized medium is formed so as to have a substantially high fluidizing velocity in an annular area of the fluidized-bed in a region near the first partition wall, thus generating an upward flow of the fluidized medium; the upward flow of the fluidized medium partly flows in the combustion furnace through the upper opening of the first partition wall and partly flows toward the central weak fluidizing region, thus forming a revolving flow in the fluidized-bed of the gasification furnace, and combustible material is supplied to the weak fluidizing region; a diffusion device is provided on a surface bottom of the combustion furnace so as to have different fluidizing velocities in the fluidized-bed; a weak fluidizing region of the fluidized-medium is formed so as to have a substantially low fluidizing velocity in a region near the first partition wall, thus generating a descending flow of the fluidized medium; an intense fluidizing region of the fluidized medium is formed so as to have a substantially high fluidizing velocity in a region apart from the first partition wall, thus generating an upward flow of the fluidized medium; and the fluidized medium which has entered the combustion furnace from the gasification furnace though the upper opening of the partition wall descends in the fluidized-bed, and char which is an ungasified component is combusted while it is descending, and the fluidized medium heated to a high temperature partly returns to the gasification furnace in the vicinity of the furnace bottom through the lower opening of the first partition wall to serve as a heat source for pyrolysis gasification in the gasification furnace.

According to the fifth aspect of the present invention, in the cylindrical gasification furnace enclosed by the first partition wall, a diffusion device is provided on a furnace bottom of the gasification furnace so as to have different fluidizing velocities in a fluidized-bed. A weak fluidizing region of the fluidized medium is formed so as to have a substantially low fluidizing velocity in the fluidized-bed in a cylindrical region near the central portion of the furnace, thus generating a descending flow of the fluidized medium, and an intense fluidizing region of the fluidized medium is formed so as to have a substantially high fluidizing velocity in the fluidized-bed in an annular region near the first partition wall, thus generating an upward flow of the fluidized medium. As a result, a revolving flow is formed in the fluidized-bed, and the fluidized medium partly forms a branched flow flowing in the combustion furnace through the upper opening of the first partition wall.

Thus, by supplying combustible material to the weak fluidizing region, the combustible material is swallowed into the descending flow, and then uniformly distributed and mixed with the fluidized medium by the revolving flow, and gasified by partial combustion during sufficient retention time. Char which is difficult to be gasified is introduced into the combustion furnace by the branched flow.

On the other hand, in the annular combustion furnace outside of the first partition wall, a diffusion device is provided on a furnace bottom of the combustion furnace so as to have different fluidizing velocities in a fluidized bed. A weak fluidizing region of the fluidized medium is formed so as to have a substantially low fluidizing velocity in the fluidized-bed in a region near the first partition wall, thus generating a descending flow of the fluidized medium, and an intense fluidizing region of the fluidized medium is formed so as to have a substantially high fluidizing velocity in the fluidized-bed in a region apart from the first partition wall, thus generating an upward flow of the fluidized medium.

The fluidized medium which has entered the combustion furnace through the upper opening of the partition wall from the gasification furnace descends in the combustion furnace with the revolving flow, and char which is an ungasified component is combusted while it is descending, and the fluidized medium heated to a high temperature returns partly to the gasification furnace through the lower opening of the partition wall in the vicinity of the furnace bottom for thereby serving as a heat source for pyrolysis gasification in the gasification furnace.

In order to perform pyrolysis gasification of fuel, thermal energy is required, and in the case of gasification of coal, thermal energy obtained by combustion of coal is normally utilized. In such a case, in order to improve the rate of gasification and suppress generation of tar, high temperature is necessary. Hence, coal which should be essentially converted into gas as much as possible is combusted uselessly.

According to the fifth aspect of the present invention, as described above, the heat of combustion of char which is ungasified component is returned to the gasification furnace with the fluidized medium having a high temperature, and hence coal can be saved without being combusted in an the amount corresponding to the quantity of heat brought in the gasification furnace. As a result, the amount of air supplied to the furnace can be reduced, the rate of gasification can be improved, and the heating value of gas per unit volume can be increased.

BRIEF DESCRIPTION OF DRAWINGS

FIG. 3 is a horizontal view of a fluidized-bed gasification and combustion furnace according to another embodiment of the present invention;

DETAILED DESCRIPTION OF THE INVENTION

Figure 1:
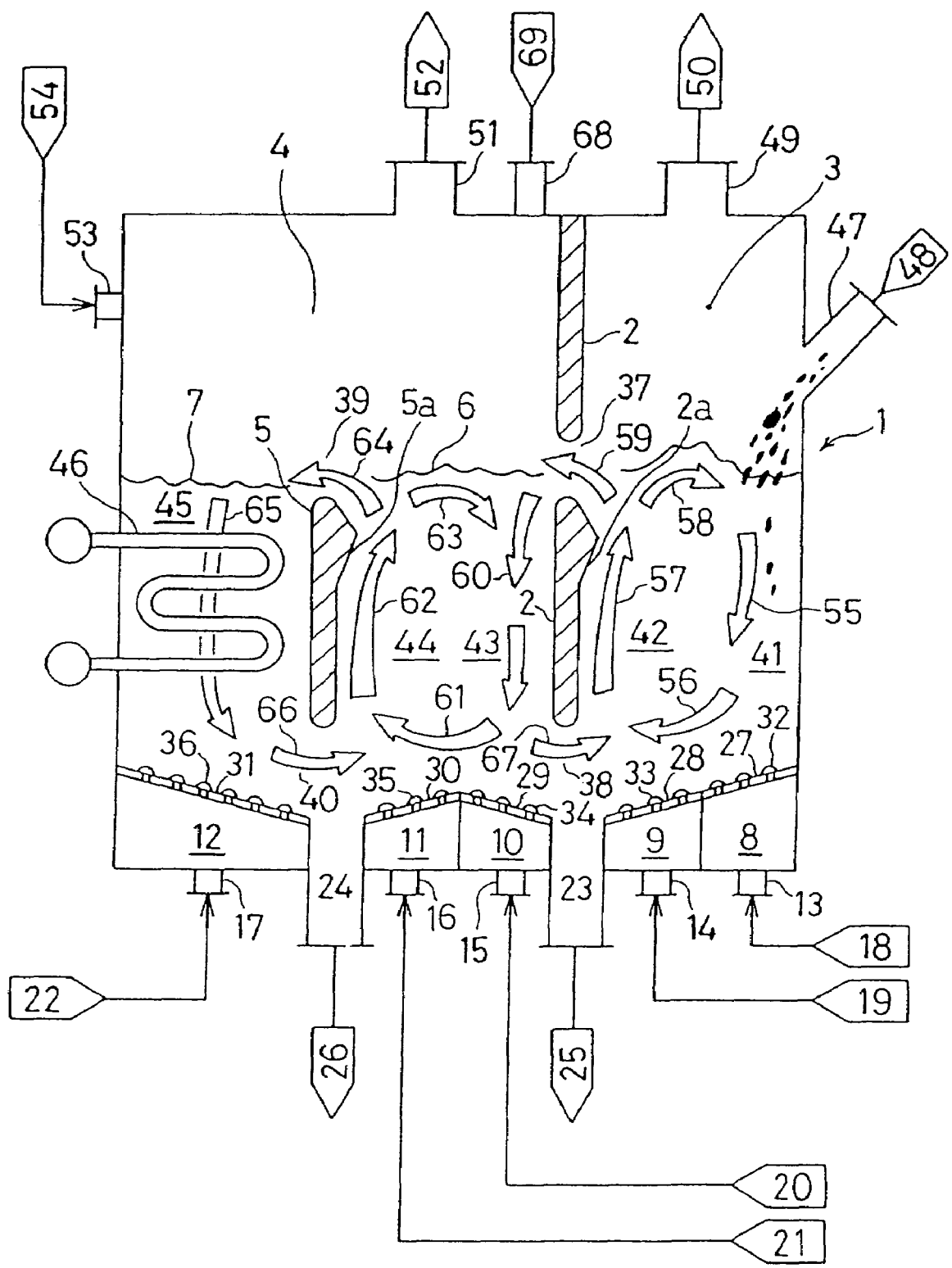
FIG. 1 is a vertical cross-sectional view of a fluidized-bed gasification and combustion furnace according to an embodiment of the present invention.

FIG. 1 is a vertical cross-sectional view of a fluidized-bed gasification and combustion furnace according to the present invention. A fluidized-bed furnace 1 according to this embodiment has a substantially rectangular shape in a horizontal cross-section. As shown in FIG. 1, the interior of the fluidized-bed furnace 1 is divided into a gasification furnace 3 and a combustion furnace 4 by a first partition wall 2. The first partition wall 2 has an upper opening 37 and a lower opening 38, and the gasification furnace 3 and the combustion furnace 4 connect with each other through the upper and lower openings 37, 38. The gasification furnace 3 has a gas discharging port 49 from which a produced gas 50 is discharged.

On the other hand, the combustion furnace 4 is further divided into a main combustion chamber 6 and a heat recovery chamber 7 by a second partition wall 5. However, the interior of the combustion furnace 4 is not divided at upper part thereof, and the main combustion chamber and the heat recovery chamber are integrated in a freeboard section. Therefore, combustion exhaust gases discharged from the respective chambers are mixed with each other in the freeboard section, and then discharged as a combustion exhaust gas 52 from a gas discharging port 51. Heat transfer surfaces 46 are immersed in a fluidized-bed in the heat recovery chamber 7 to recover heat from a fluidized medium in the fluidized-bed. The second partition wall 5 has a lower opening 40, and the fluidized medium can move between the main combustion chamber 6 and the heat recovery chamber 7 through the lower opening 40 and an upper opening 39.

The gasification furnace 3 has furnace bottoms 27, 28 at the lower part thereof, and wind boxes 8, 9 are provided under the furnace bottoms 27, 28. Fluidizing gases 18, 19 are introduced into the wind boxes 8, 9 through supplying ports 13, 14. On the other hand, diffusion devices 32, 33 are provided on the furnace bottoms 27, 28, respectively. A fluidizing gas is ejected from the diffusion device 32 so as to have a substantially low fluidizing velocity, thus forming a weak fluidizing region 41 of the fluidized medium over the furnace bottom 27. A fluidizing gas is ejected from the diffusion device 33 so as to have a substantially high fluidizing velocity, thus forming an intense fluidizing region 42 of the fluidized medium over the furnace bottom 28.

Since the two different fluidizing regions are formed in the fluidized-bed of the gasification furnace 3, a revolving flow in which the fluidized medium descends in the weak fluidizing region 41 and ascends in the intense fluidizing region 42 is created.

On the other hand, in the combustion furnace 4, the main combustion chamber 6 has furnace bottoms 29, 30 at the lower part thereof, and wind boxes 10, 11 are provided under the furnace bottoms 29, 30. Fluidizing gases 20, 21 are introduced into the wind boxes 10, 11 through supplying ports 15, 16. Further, diffusion devices 34, 35 are provided on the furnace bottoms 29, 30, respectively. A fluidizing gas is ejected from the diffusion device 34 so as to have a substantially low fluidizing velocity, thus forming a weak fluidizing region 43 of the fluidized medium over the furnace bottom 29. A fluidizing gas is ejected from the diffusion device 35 so as to have a substantially high fluidizing velocity, thus forming an intense fluidizing region 44 of the fluidized medium over the furnace bottom 30.

Since the two different fluidizing regions are formed in the fluidized-bed of the main combustion chamber 6, a revolving flow in which the fluidized medium descends in the weak fluidizing region 43 and ascends in the intense fluidizing region 44 is created.

On the other hand, the heat recovery chamber 7 has a furnace bottom 31 at the lower part thereof, and a wind box 12 is provided under the furnace bottom 31. A fluidizing gas 22 is introduced into the wind box 12 through a supplying port 17. Further, a diffusion device 36 is provided on the furnace bottom 31. A fluidizing gas is ejected from the diffusion device 36 so as to have a substantially low fluidizing velocity, thus forming a weak fluidizing region 45 of the fluidized medium over the furnace bottom 31.

As described above, by combining a plurality of different fluidizing regions having different fluidizing velocities, the following flows are created.

In the fluidized-bed of the gasification furnace 3, the fluidized medium descends with a descending flow 55 in the weak fluidizing region 41, and turns its direction in the vicinity of the furnace bottom 27 to a horizontal flow 56 directed to the intense fluidizing region 42, and then turns its direction further to an upward flow 57 in the intense fluidizing region 42. Further, in the vicinity of the surface of the fluidized-bed, the upward flow 57 of the fluidized medium is divided into a flow 58 directed to the weak fluidizing region 41 and a branched flow 59 passing through the upper opening 37 of the first partition wall 2 and directed to the combustion furnace 4.

Therefore, in the fluidized-bed of the gasification furnace 3, a revolving flow in which the fluidized medium descends in the weak fluidizing region 41 and ascends in the intense fluidizing region 42 is created, and part of the fluidized medium is introduced into the main combustion chamber 6 through the upper opening 37 at the upper portion of the first partition wall.

On the other hand, in the main combustion chamber 6, the weak fluidizing region 43 of the fluidized medium is formed over the furnace bottom 29, and the intense fluidizing region 44 is formed over the furnace bottom 30, and hence in the fluidized-bed of the main combustion chamber 6 also, the fluidized medium descends with the descending flow 60 in the weak fluidizing region 43. Then, in the vicinity of the furnace bottom 29, part of the fluidized medium is returned to the gasification furnace 3 with a return flow 67 passing through the lower opening 38 of the first partition wall 2, and the remainder forms a horizontal flow 61 directed to the intense fluidizing region 44, and then forms an upward flow 62 further in the intense fluidizing region 44, on the other hand, in the vicinity of the surface of the fluidized-bed, the upward flow 62 of the fluidized medium is divided into a flow 63 directed to the weak fluidizing region 43 and a branched flow 64 passing through the upper opening 39 of the second partition wall 5 and directed to the heat recovery chamber 7.

Therefore, in the fluidized-bed of the combustion furnace 4, a revolving flow in which the fluidized medium descends in the weak fluidizing region 43 and ascends in the intense fluidizing region 44 is created, and part of the fluidized medium is introduced into the heat recovery chamber 7 beyond the upper end of the second partition wall 5.

Further, since the weak fluidizing region 45 is formed in the heat recovery chamber 7, a descending flow 65 of the fluidized medium is formed therein, and then the fluidized medium is returned to the main combustion chamber 6 with a return flow 66 passing through the lower opening 40 of the second partition wall 5. In this manner, in the fluidized-beds in the gasification furnace 3, the main combustion chamber 6 of the combustion furnace 4, and the heat recovery chamber 7 of the combustion furnace 4, the respective revolving flows are formed therein and a circulating flow is formed between adjacent fluidized-beds.

Therefore, a combustible material supplying port 47 is provided above the weak fluidizing region 41 of the gasification furnace 3, and combustible material 48 is supplied therethrough to the weak fluidizing region 41. The supplied combustible material 48 is swallowed into the fluidized-bed of the gasification furnace 3 by the descending flow 55, and then uniformly distributed and mixed with the fluidized medium by the revolving flow, and partially combusted and gasified. The oxygen content of the fluidizing gas supplied to the furnace bottom of the gasification furnace 3 is set to the amount of oxygen equal to or smaller than a theoretical oxygen demand of the supplied combustible material 48. The fluidizing gas comprises any one of air, steam, oxygen and combustion exhaust gas, or a mixture of two or more of them.

On the other hand, the fluidized medium containing unburned char is introduced into the main combustion chamber 6 by the branched inlet flow 59 and swallowed into the fluidized-bed by the descending flow 60, and unburned char is then uniformly distributed and mixed by the revolving flow, and completely combusted in an oxidizing atmosphere. As shown in FIG. 1, when necessary, a fuel supplying port 68 is provided above the weak fluidizing region 43, and auxiliary fuel 69 may be supplied therethrough to the weak fluidizing region 43.

Further, a plurality of nozzles 53 are provided at the freeboard to supply secondary air 54 for performing complete combustion, if necessary.

The quantity of heat generated by combustion in the main combustion chamber 6 of the combustion furnace 4 is partly introduced into the gasification furnace 3 by the return flow 67 passing through the lower opening 38 of the first partition wall 2 to serve as a heat source for gasification, and further partly introduced into the heat recovery chamber 7 by the circulating flow in which the fluidized medium passes through the upper opening 39 of the second partition wall as the branched inlet flow 64 and then descends as the descending flow 65, and passes through the heat recovery chamber 7 and returns to the main combustion chamber 6 through the lower opening 40 of the second partition wall whereby part of the quantity of heat generated by combustion in the main combustion chamber 6 is removed by the heat transfer surfaces 46.

In this manner, the energy of combustible material supplied to the system is partly converted to gas having chemical energy, and components which are difficult to be gasified are effectively recovered as thermal energy at a high efficiency.

Further, combustible material supplied to the furnace mostly contains incombustible material. Therefore, in this embodiment, an incombustible material discharging port 23 is provided between the furnace bottom 28 of the gasification furnace 3 and the furnace bottom 29 of the combustion furnace 4 for discharging incombustible material 25 therethrough. Further, in the case where the auxiliary fuel 69 contains incombustible material, as in this embodiment, an incombustible material discharging port 24 is provided between the furnace bottom 30 of the main combustion chamber 6 and the furnace bottom 31 of the heat recovery chamber 7 for discharging incombustible material 26 therethrough. Further, in order to facilitate discharge of the incombustible material, it is desirable that the respective furnace bottoms have downwardly inclined surfaces which are directed to the discharging port. The first partition wall 2 forming a boundary between the gasification furnace 3 and the combustion furnace 4 has an inclined surface 2a inclined toward the gasification furnace in the gasification furnace side, and a vertical surface in the combustion furnace side. In the combustion furnace 4, the second partition wall 5 forming a boundary between the main combustion chamber 6 and the heat recovery chamber 7 has an inclined surface 5a inclined toward the main combustion chamber in the main combustion chamber side, and a vertical surface in the heat recovery chamber side. Incidentally, the inclined surfaces 2a, 5a may be replaced with vertical surfaces, respectively.

Figure 2:
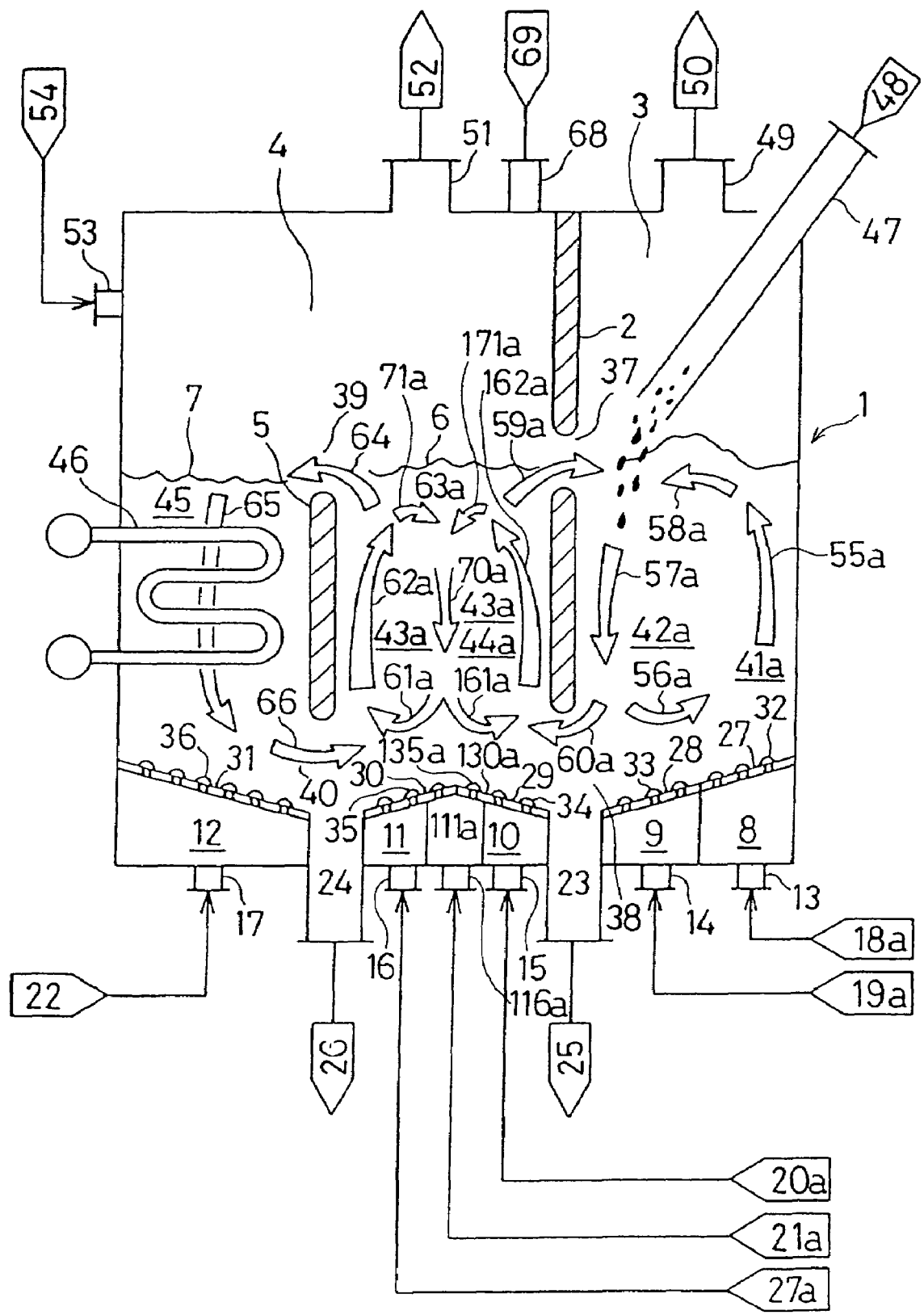
FIG. 2 is a vertical cross-sectional view of a fluidized-bed gasification and combustion furnace according to another embodiment of the present invention.

FIG. 2 is a vertical cross-sectional view of another fluidized-bed gasification and combustion furnace according to the present invention. As shown in FIG. 2, the interior of the fluidized-bed furnace 1 is divided into a gasification furnace 3 and a combustion furnace 4 by a first partition wall 2. The first partition wall 2 has an upper opening 37 and a lower opening 38, and the gasification furnace 3 and the combustion furnace 4 communicate with each other through the upper and lower openings 37, 38. The first partition wall 2 forming a boundary between the gasification furnace 3 and the combustion furnace 4 may have an inclined surface or a vertical surface as in the first embodiment. The second partition wall 5 may have the same structure. The gasification furnace 3 has a gas discharging port 49 from which a produced gas 50 is discharged.

On the other hand, the combustion furnace 4 is further divided into a main combustion chamber 6 and a heat recovery chamber 7 by a second partition wall 5. However, the interior of the combustion furnace 4 is not divided at the upper part thereof, and the matin combustion chamber and the heat recovery chamber are integrated in a freeboard section. Therefore, combustion exhaust gases discharged from the respective chambers are mixed with each other in the freeboard section, and are then discharged as a combustion exhaust gas 52 from a gas discharging port 51. Heat transfer surfaces 46 are immersed in a fluidized-bed in the heat recovery chamber 7 to recover heat from a fluidized medium in the fluidized-bed. The second partition wall 5 has a lower opening 40, and the fluidized medium can move between the main combustion chamber 6 and the heat recovery chamber 7 through the lower opening 40 and an upper opening 39.

The gasification furnace 3 has furnace bottoms 27, 28 at the lower part thereof, and wind boxes 8, 9 are provided under the furnace bottoms 27, 28. Fluidizing gases 18a, 19a are introduced into the wind boxes 8, 9 through supplying ports 13, 14. Further, diffusion devices 32, 33 are provided on the furnace bottoms 27, 28, respectively. A fluidizing gas is ejected from the diffusion device 32 so as to have a substantially high fluidizing velocity, thus forming an intense fluidizing region 41a of the fluidized medium over the furnace bottom 27. A fluidizing gas is ejected from the diffusion device 33 so as to have a substantially low fluidizing velocity, thus forming a weak fluidizing region 42a of the fluidized medium over the furnace bottom 28.

Since the two different fluidizing regions are formed in the fluidized-bed of the gasification furnace 3, a revolving flow in which the fluidized medium ascends in the intense fluidizing region 41a and descends in the weak fluidizing region 42a is created.

On the other hand, in the combustion furnace 4, the main combustion chamber 6 has furnace bottoms 29, 30, 130a at the lower part thereof, and wind boxes 10, 11, IIIa are provided under the furnace bottoms 29, 30, 130a. Fluidizing gases 20a, 27a, 21a are introduced into the wind boxes 10, 11, IIIa through supplying ports 15, 16, 116a. Further, diffusion devices 34, 35, 135a are provided on the furnace bottoms 29, 30, 130a, respectively. Fluidizing gases are ejected from the diffusion devices 34, 35 so as to have a substantially high fluidizing velocity, thus forming intense fluidizing regions 162a, 62a of the fluidized medium over the furnace bottoms 29, 30. A fluidizing gas is ejected from the diffusion device 135a so as to have a substantially low fluidizing velocity, thus forming a weak fluidizing region 43a of the fluidized medium over the furnace bottom 130a.

Since the two different fluidizing regions are formed in the fluidized-bed of the main combustion chamber 6, revolving flows in which the fluidized medium descends in the weak fluidizing region 44a and ascends in the intense fluidizing regions 43a, 43a are created.

On the other hand, the heat recovery chamber 7 has a furnace bottom 31 at the lower part thereof, and a wind box 12 is provided under the furnace bottom 31. A fluidizing gas 22 is introduced into the wind box 12 through a supplying port 17. Further, a diffusion device 36 is provided on the furnace bottom 31. A fluidizing gas is ejected from the diffusion device 36 so as to have a substantially low fluidizing velocity, thus forming a weak fluidizing region 45 of the fluidized medium over the furnace bottom 31.

As described above, by combining a plurality of different fluidizing regions having different fluidizing velocities, the following flows are created.

In the fluidized-bed of the gasification furnace 3, the fluidized medium descends with a descending flow 57a in the weak fluidizing region 42a, and turns its direction in the vicinity of the furnace bottom 28 to a horizontal flow 56a directed to the intense fluidizing region 41a, and then turns its direction further to an upward flow 55a in the intense fluidizing region 41a. On the other hand, in the vicinity of the furnace bottom 28, the descending flow 57a of the fluidized medium is divided into a flow 56a directed to the intense fluidizing region 41a and a branched inlet flow 60a passing through the lower opening 38 of the first partition wall 2 and directed to the combustion furnace 4.

Therefore, in the fluidized-bed of the gasification furnace 3, a revolving flow in which the fluidized medium descends in the weak fluidizing region 42a and ascends in the intense fluidizing regions 41a is created, and part of the fluidized medium is introduced into the main combustion chamber 6 through the lower opening 38 at the lower part of the first partition wall.

In the main combustion chamber 6, the intense fluidizing regions 43a of the fluidized medium are formed over the furnace bottoms 29, 30, and the weak fluidizing region 44a is formed over the furnace bottom 130a. Hence, in the fluidized-bed of the main combustion chamber 6, the fluidized medium descends with the descending flow 70a in the weak fluidizing region 44a. Then, in the vicinity of the surface of the fluidized-bed, part of the fluidized medium is returned to the gasification furnace 3 with a branched return flow 59a passing through the upper opening 37 of the first partition wall 2, and the remainder forms a horizontal flow 171a directed to the weak fluidizing region 44a, and then forms a descending flow 70a further in the weak fluidizing region 44a. On the other hand, in the vicinity of the surface of the fluidized-bed, the upward flow 62a of the fluidized medium is divided into a flow 71a directed to the weak fluidizing region 44a and a branched inlet flow 64 passing through the upper opening 39 of the second partition wall 5 and directed to the heat recovery chamber 7.

Therefore, in the fluidized-bed of the main combustion chamber 6 of the combustion furnace 4, revolving flows in which the fluidized medium descends in the weak fluidizing region 44a and ascends in the intense fluidizing regions 43a are created, and part of the fluidized medium is introduced into the heat recovery chamber 7 beyond the upper end of the second partition wall 5. Further, part of the fluidized medium is introduced into the gasification furnace 3 through the upper opening 37 of the first partition wall 2.

Since the weak fluidizing region 45 is formed in the heat recovery chamber 7, a descending flow 65 of the fluidized medium is formed therein, and then the fluidized medium is returned to the main combustion chamber 6 with a return flow 66 passing through the lower opening 40 of the second partition wall 5. In this manner, in the fluidized-beds in the gasification furnace 3 and the main combustion chamber 6 of the combustion furnace 4, the respective revolving flows are formed therein and a circulating flow is formed between two adjacent fluidized-beds. In the heat recovery chamber 7 of the combustion furnace 4, a descending flow is formed therein and a circulating flow is formed between the heat recovery chamber 7 and the main combustion chamber 6.

Therefore, a combustible material supplying port 47 is provided above the weak fluidizing region 42a of the gasification furnace 3, and combustible material 48 is supplied therethrough to the weak fluidizing region 42a. The supplied combustible material is swallowed into the fluidized-bed of the gasification furnace 3 by the descending flow 57a, and then uniformly distributed and mixed with the fluidized medium by the revolving flow, and partially combusted and gasified. The oxygen content of the fluidizing gas supplied to the furnace bottom of the gasification furnace 3 is set to the amount of oxygen equal to or smaller than a theoretical oxygen demand of the supplied combustible material 48. The fluidizing gas comprises any one of air, steam, oxygen and combustion exhaust gas, or a mixture of two or more of them.

On the other hand, the fluidized medium containing unburned char is introduced into the main combustion chamber 6 by the branched inlet flow 60a, and unburned char is then uniformly distributed and mixed by the revolving flow, and completely combusted in an oxidizing atmosphere. As shown in FIG. 2, if necessary, a fuel supplying port 68 is provided above the main combustion chamber 6, and auxiliary fuel 69 may be supplied therethrough to the main combustion chamber 6.

Further, a plurality of nozzles 53 are provided at the freeboard to supply secondary air 54 for complete combustion, when necessary.

The quantity of heat generated by combustion in the main combustion chamber 6 of the combustion furnace 4 is partly introduced into the gasification furnace 3 by the branched return flow 59a passing through the upper opening 37 of the first partition wall 2 to serve as a heat source for gasification, and is further partly introduced into the heat recovery chamber 7 by the circulating flow in which the fluidized medium passes through the upper opening 39 of the second partition wall as the branched inlet flow 64 and then descends as the descending flow 65, and passes through the heat recovery chamber 7 and returns to the main combustion chamber 6 through the opening 40 of the second partition wall whereby part of the quantity of heat generated by combustion in the main combustion chamber 6 is taken out by the heat transfer surfaces 46.

In this manner, the energy of combustible material supplied to the system is partly converted to the gas having chemical energy, and components which are difficult to be gasified are effectively recovered as thermal energy at a high efficiency.

Further, combustible material supplied to the furnace contains mostly incombustible material. Therefore, in this embodiment, an incombustible material discharging port 23 is provided between the furnace bottom 28 of the gasification furnace 3 and the furnace bottom 29 of the combustion furnace 4 for discharging incombustible material 25 therethrough. Further, in case where the auxiliary fuel 69 contains incombustible material, as in this embodiment, an incombustible material discharging port 24 is provided between the furnace bottom 30 of the main combustion chamber 6 and the furnace bottom 31 of the heat recovery chamber 7 for discharging incombustible material 26 therethrough. Further, in order to facilitate discharge of the incombustible material, it is desirable that the respective furnace bottoms have downwardly inclined surfaces which are directed to the discharging port.

FIG. 3 shows a fluidized-bed gasification and combustion furnace according to another embodiment different from the embodiments shown in FIGS. 1 and 2. In the embodiments shown in FIGS. 1 and 2, the gasification furnace 3, the main combustion chamber 6 and the heat recovery chamber 7, each having a rectangular shape in a horizontal cross-section, are arrayed in a straight line, but in the embodiment shown in FIG. 3, they are arrayed at right angles to one another. FIG. 3 is a horizontal cross-sectional view of a fluidized-bed gasification and combustion furnace according to the present invention. As shown in FIG. 3, the interior of the fluidized-bed furnace 1 is divided into a gasification furnace 3 and a combustion furnace 4 by a first partition wall 2.

On the other hand, the combustion furnace 4 is divided into a main combustion chamber 6 and a heat recovery chamber 7 by a second partition wall 5. However, differently from the embodiment shown in FIG. 1, the first partition wall 2 and the second partition wall 5 are located at the same level and the gasification furnace 3 and the heat recovery chamber 7 are adjacent to each other with a third partition wall 70 interposed therebetween. Incidentally, the third partition wall 70 has no opening, and the gasification furnace 3 and the heat recovery chamber 7 are completely separated from each other.

Further, the fluidized-bed, as in the embodiment shown in FIG. 1, has regions having respective fluidizing velocity. Hence, in the fluidized-bed of the gasification furnace 3, a revolving flow in which the fluidized medium descends in the weak fluidizing region 41 and ascends in the intense fluidizing region 42 is created, and part of the fluidized medium is moved to the main combustion chamber 6 by a branched inlet flow.

In the main combustion chamber 6 also, a revolving flow in which the fluidized medium descends in the weak fluidizing region 43 and ascends in the intense fluidizing region 44 is created, and part of the fluidized medium is moved to the heat recovery chamber 7 by a branched inlet flow 64. However, different from the embodiment shown in FIG. 1, the revolving face of the revolving flow in the main combustion chamber 6 is perpendicular to the revolving face of the revolving flow in the gasification furnace 3. Further, the circulating face of the circulating flow between the main combustion chamber 6 and the heat recovery chamber 7 is perpendicular to the revolving face of the revolving flow in the main combustion chamber 6. By this arrangement, the fluidized-bed furnace 1 has a substantially square horizontal cross-section, which is advantageous in manufacturing and constructing the plant.

Figure 4:
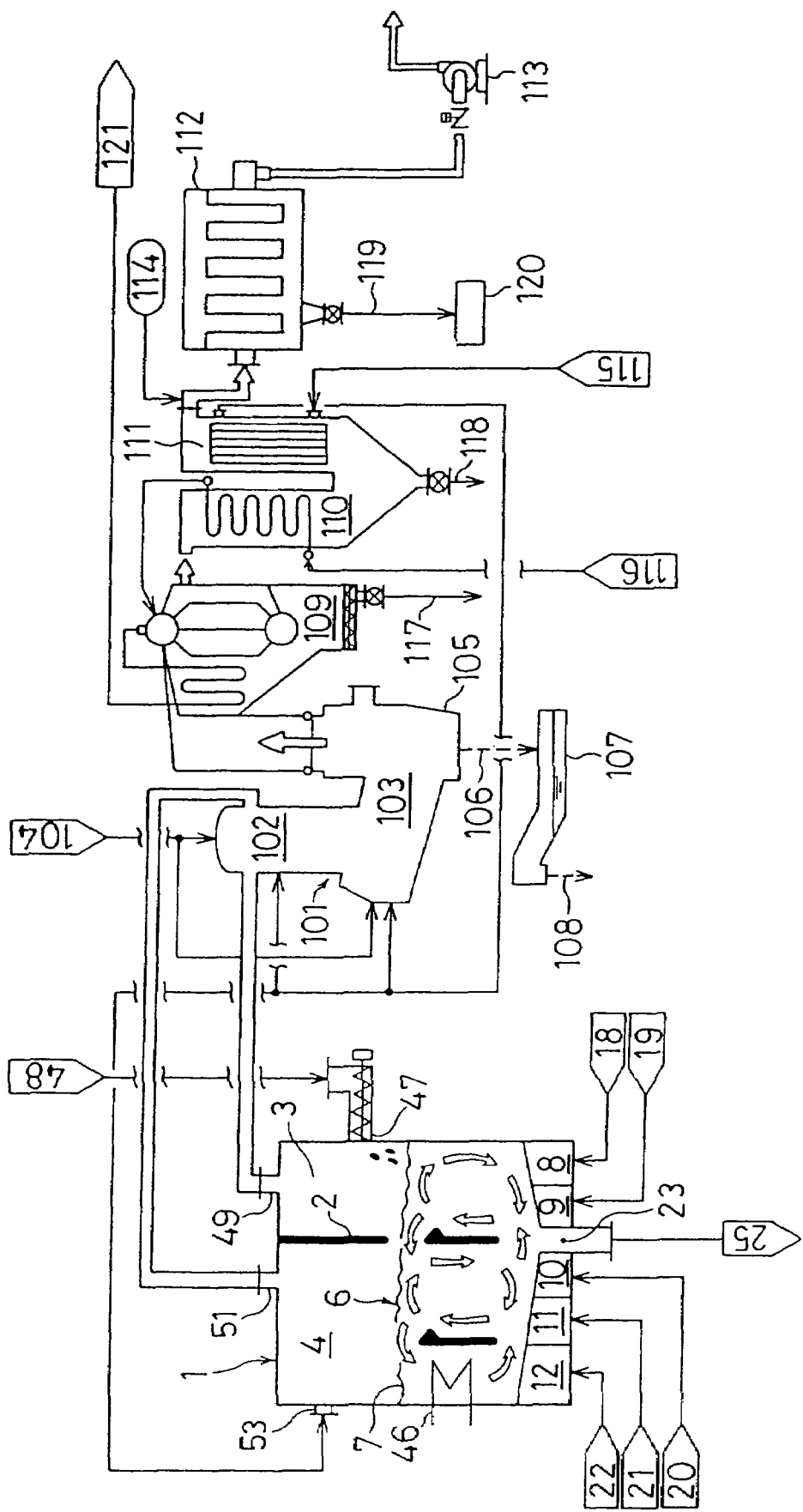
FIG. 4 is a schematic diagram of a fluidized-bed gasification and combustion furnace according to the present invention which is used by being combined with a waste heat boiler and a steam turbine.

FIG. 4 shows a cylindrical fluidized-bed gasification and combustion furnace according to an embodiment of the present invention which is used by being combined with a waste heat boiler and a steam turbine. As shown in FIG. 4, the produced gas discharged from the gas discharging port 49 of the gasification furnace 3 and the combustion exhaust gas discharged from the gas discharging port 51 of the combustion furnace 4 are led to a slagging combustion furnace 101, and tangentially blown into a cylindrical primary combustion chamber 102. Auxiliary fuel 104, when necessary, is supplied to the primary combustion chamber 102 and a secondary combustion chamber 103, and oxygen or air or a mixture of oxygen and air is supplied thereto. Hence, the auxiliary fuel 104 is combusted at a temperature ranging from 1200 to 1500° C. As a result, ashes are melted, and harmful substances such as dioxins or PCB are decomposed by a high temperature. Melting ashes 106 are discharged from the discharging port 105, quenched in a water chamber 107 to be converted into a slag 108 which is discharged therefrom.

On the other hand, combustion gas having a high temperature discharged from the slagging combustion furnace 101 is cooled by a waste heat boiler 109, an economizer 110 and an air preheater 111 one by one, and is discharged to the atmosphere through a dust collector 112 and an induced draft fan 113. A neutralizer 114 such as slaked lime, if necessary, is added to the combustion gas discharged from the air preheater 111 at the inlet of the dust collector 112.

Further, boiler feedwater 116 is converted into superheated steam 121 in the waste heat boiler 109 via the economizer 110, and the superheated steam 121 drives a steam turbine. Further, gas 115 for combustion comprises oxygen or air or a mixture of oxygen and air, and is heated by the air preheater 111, and is then supplied to the slagging combustion furnace 101 and the freeboards of the combustion furnace 4. Further, not illustrated in the drawing, it is possible to use the gas 115 as the fluidizing gases 18-22. Further, steam obtained by the immersed heat transfer tubes 46 drives a medium-pressure turbine or a low-pressure turbine.

Further, not illustrated in the drawing, ashes 117, 118 discharged from the waste heat boiler 109, the economizer 110 and the air preheater 111 may be returned to the combustion furnace 4.

On the other hand, fly ash 119 collected by the dust collector 112, if they contain alkali metal salt such as vaporized Na or K, are treated by chemicals in treatment equipment 120.

Figure 5:
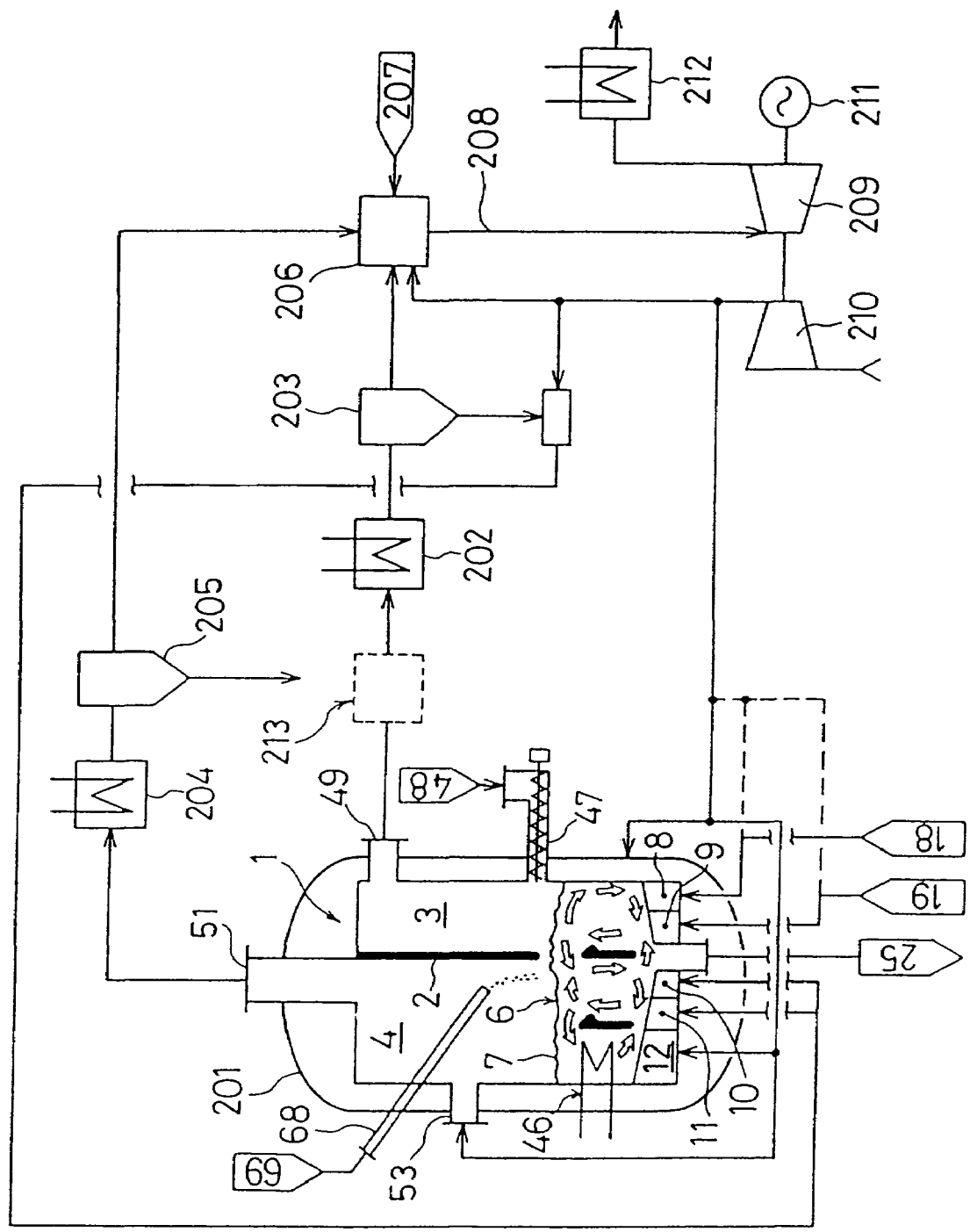
FIG. 5 is a schematic diagram of a system in which a fluidized-bed gasification and combustion furnace according to the present invention is operated under a pressure equal to or higher than an atmospheric pressure.

FIG. 5 is a view of a fluidized-bed gasification and combustion furnace according to an embodiment of the present invention which is operated under a pressure equal to or higher than an atmospheric pressure.

Not illustrated in FIG. 5, a fluidized-bed furnace 1 may have a pressure-tight structure. However, since the structure in which heat-resisting function and pressure-tight function are separated from each other is advantageous, in this embodiment, the fluidized-bed furnace 1 is housed in a pressure vessel 201, and the gasification furnace 3 and the combustion furnace 4 can be operated under a pressure equal to or higher than an atmospheric pressure.

The discharging port 51 for the combustion gas from the combustion furnace 4, the discharging port 49 for the produced gas from the gasification furnace 3, the combustible material supplying port 47 of the gasification furnace 3, the secondary air supplying port 53 of the combustion furnace 4, the fluidizing gas supplying lines, and the incombustible material discharging line, and the like pass through the pressure vessel 201.

In this embodiment, combustible material 48 is supplied to the gasification furnace 3, and is gasified by partial combustion. The method for supplying the combustible material is carried out by a screw feeder shown in the drawing, and may be carried out by pneumatic transportation. Alternatively, combustible material may be supplied in a slurry condition.

Unburned char generated in the gasification furnace 3 and accompanied by the produced, gas is cooled to a temperature of 600° C. or lower in a gas apparatus 202 provided downstream, and alkali metal such as Na or K which will cause hot corrosion of, for example, gas turbine blades is solidified or deposited onto surfaces of particles. The solidified particles or deposited particles are collected by a dust collector 205 and discharged therefrom. The dust collectors 203, 205 may comprise a ceramic filter in many cases, but other types of dust collectors may be used.

The combustion gas which has been purified by removing Na or K which will cause hot corrosion, and the produced gas which has been purified by removing dust with the dust collector 203 downstream of the gasification furnace 3 are mixed and combusted in the combustor 206. In this case, the respective gases are cooled, and therefore thermal energy which is brought into the combustor 206 is lowered by this gas cooling. Thus, in order to combust the gases in the combustor 206 at a high temperature, the combustion furnace 4 is operated at an excess air ratio as small as possible to thereby reduce the amount of combustion exhaust gas. Oxygen required for combustion in the combustor 206 is supplied to the combustor 206 as oxygen 207.

The combustion exhaust gas having a high temperature and a high pressure discharged from the combustor 206 drives a gas turbine 209 at a high efficiency. The gas turbine 209 drives a compressor 210 and a generator 211.

The exhaust gas discharged from the gas turbine 209 is cooled in heat recovery equipment 212, and is then discharged to the atmosphere. Incidentally, in this embodiment, if material of turbine blades is improved, the gas cooling apparatuses 202, 204 may be removed.

On the other hand, in the case of using coal as combustible material 48, a desulfurizing reaction is carried out in the furnace by mixing coal with limestone 214 or by supplying the limestone 214 separately to the furnace. That is, hydrogen sulfide $H_2S$ generated in the gasification furnace 3 is caused to react with CaO to generate CaS by desulfurizing reaction, and the generated CaS is supplied to the dust collector 203 together with the produced gas and collected therein, and then the collected CaS is supplied to the main combustion chamber 6.

Further, the fluidized medium containing unburned char and CaS is introduced into the main combustion chamber 6 by a branched inlet flow passing through the opening at the upper part of the first partition wall of the gasification furnace 3. In the main combustion chamber 6, the fluidized medium containing unburned char and CaS is swallowed into the fluidized-bed by a descending flow, and the unburned char is uniformly distributed and mixed by the revolving flow, and completely combusted in an oxidizing atmosphere, while CaS is converted into $CaSO_4$ and the converted $CaSO_4$ accompanied by combustion exhaust gas is supplied to the dust collector 205 in which $CaSO_4$ is collected and discharged therefrom. In the case where the desulfurizing reaction is insufficiently carried out in the gasification furnace 3, additional desulfurizing equipment 213 may be provided downstream of the gasification furnace.

Figure 6:
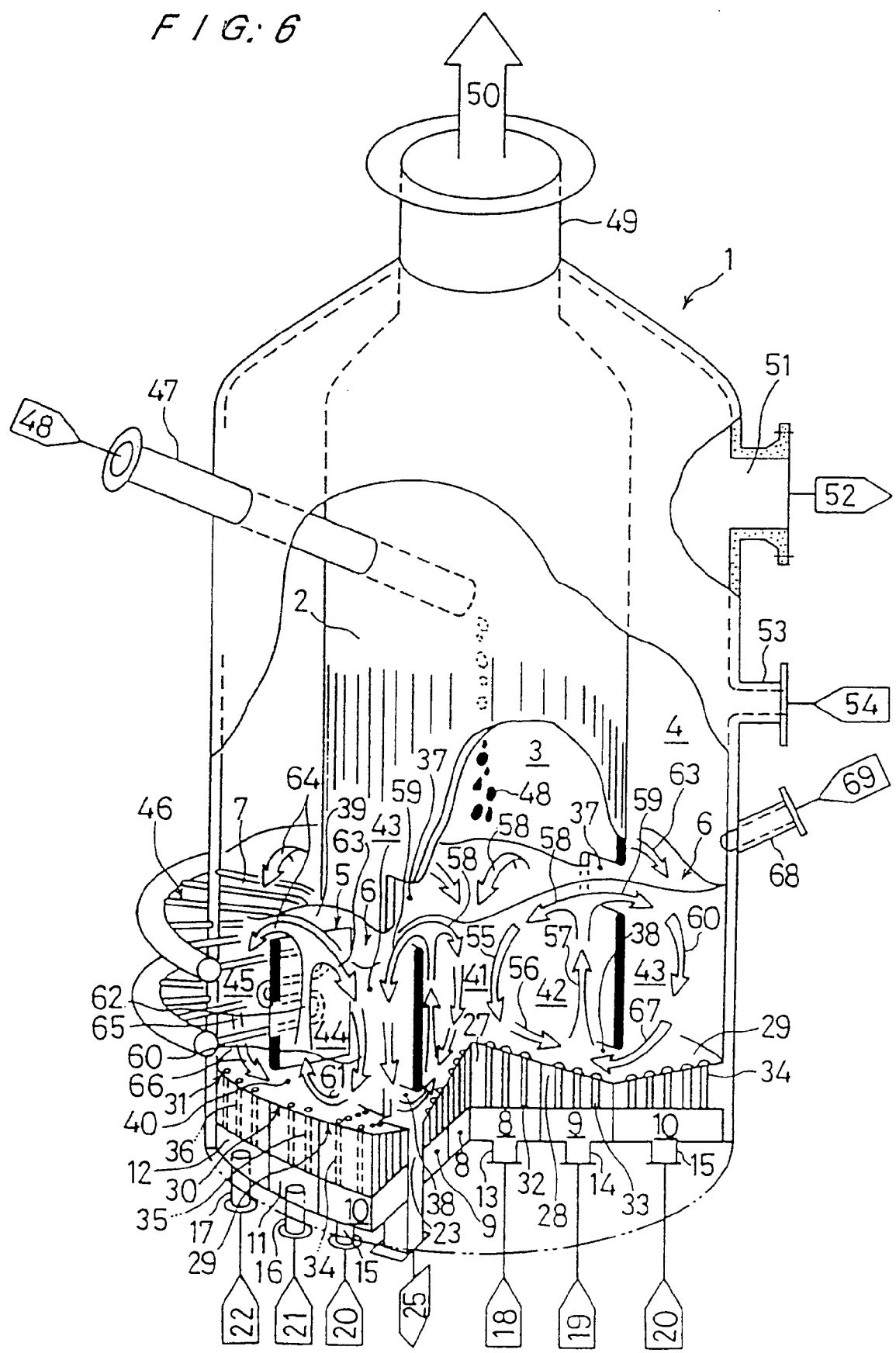
FIG. 6 is a vertical cross-sectional view of a cylindrical fluidized-bed gasification and combustion furnace according to an embodiment of the present invention.
Figure 7:
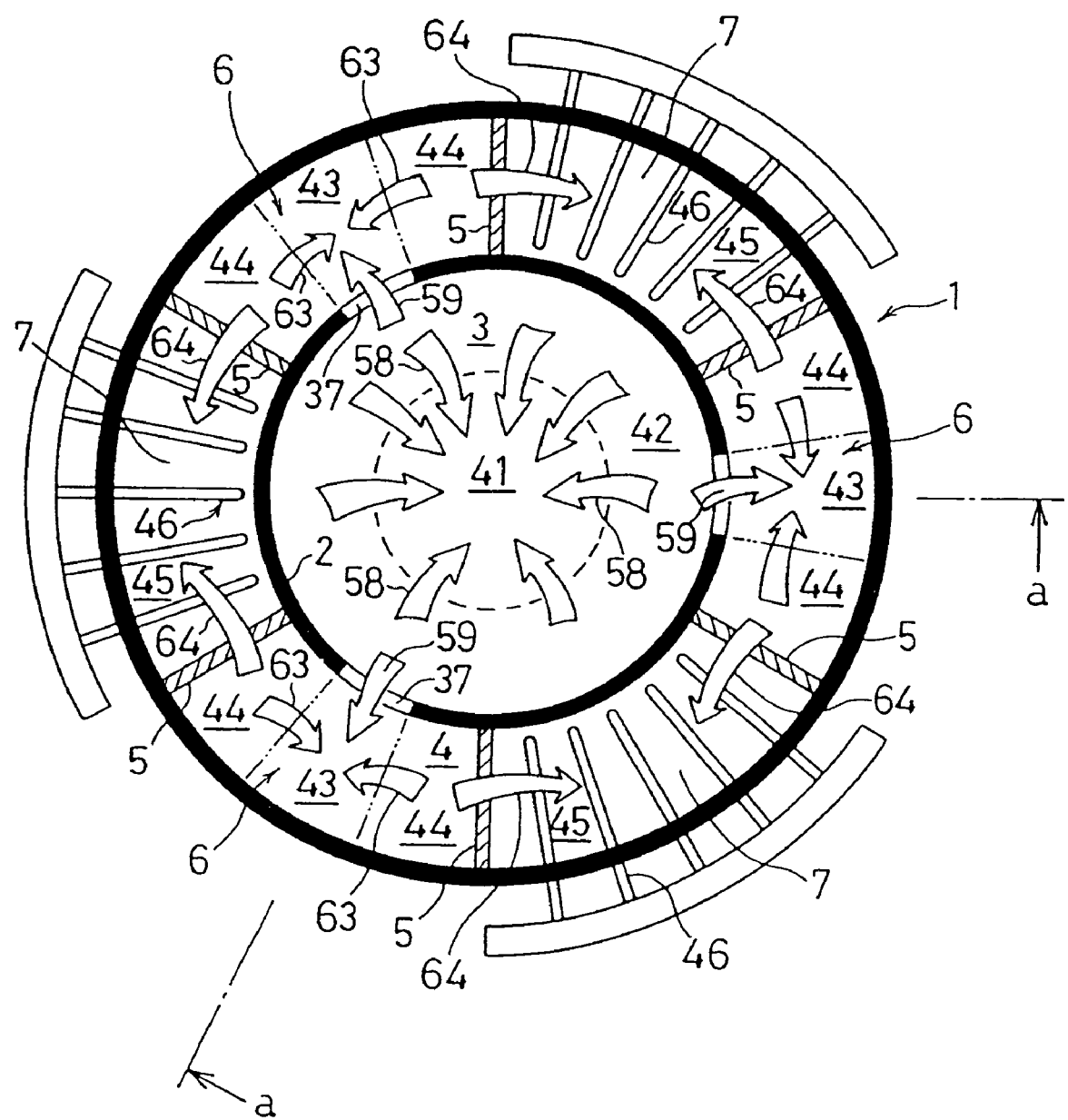
FIG. 7 is a horizontal cross-sectional view of a fluidized-bed portion of FIG. 6.

FIG. 6 is a partially cross-sectional view of a cylindrical fluidized-bed gasification and combustion furnace according to the present invention. FIG. 7 shows a horizontal cross-section of a fluidized-bed portion. Further, in FIG. 6, a vertical cross-section in the fluidized-bed portion corresponds to a portion as viewed from line a-a of FIG. 7. Here, the description is made with reference to FIGS. 6 and 7.

In the embodiment shown in FIGS. 6 and 7, elements (or components) having the same or similar functions as the elements (or components) in the embodiment shown in FIG. 1 will be described using the same reference numerals.

An interior of a cylindrical fluidized-bed furnace 1 is divided into a gasification furnace 3 and an annular combustion furnace 4 by a first partition wall 2 which is concentric with an outer wall of the furnace. The first partition wall 2 has a plurality of upper rectangular openings 37 and a plurality of lower rectangular openings 38, and the gasification furnace 3 and the combustion furnace 4 communicate with each other through the upper and lower openings 37, 38. The first partition wall 2 forming a boundary between the gasification furnace 3 and the combustion furnace 4 has an inclined surface inclined to the gasification furnace in the gasification furnace side, and a vertical surface in the combustion furnace side, not shown in FIG. 6 but shown in FIG. 10. The gasification furnace 3 has a gas discharging port 49 from which a produced gas 50 is discharged to the outside.

On the other hand, the combustion furnace 4 is further divided into a plurality of main combustion chambers 6 and a plurality of heat recovery chambers 7 by a plurality of second partition walls 5 extending radially. However, the interior of the combustion furnace 4 is pot divided at an upper part thereof, and the main combustion chambers and the heat recovery chambers are integrated in a freeboard section. Therefore, combustion exhaust gases discharged from the respective chambers are mixed with one another in the freeboard section, and then discharged as a combustion exhaust gas 52 from a gas discharging port 51 to the outside. Heat transfer surfaces 46 are immersed in the fluidized-bed in the respective heat recovery chambers 7 to recover heat from the fluidized medium in the fluidized-bed. Each of the second partition walls 5 has a lower opening 40, and the fluidized medium can move between the main combustion chamber 6 and the heat recovery chamber 7 through the lower opening 40 and an upper opening 39.

The gasification furnace 3 has a furnace bottom 27 at the lower central part thereof and an annular furnace bottom 28 so as to surround the furnace bottom 27, and wind boxes 8, 9 are provided under the furnace bottoms 27, 28. Fluidizing gases 18, 19 are introduced into the wind boxes 8, 9 through supplying ports 13, 14. Further, diffusion devices 32, 33 are provided on the furnace bottoms 27, 28, respectively. A fluidizing gas is ejected from the diffusion device 32 so as to have a substantially low fluidizing velocity, thus forming a weak fluidizing region 41 of the fluidized medium over the furnace bottom 27. A fluidizing gas is ejected from the diffusion device 33 so as to have a substantially high fluidizing velocity, thus forming an intense fluidizing region 42 of the fluidized medium over the furnace bottom 28.

Since the two different fluidizing regions are formed in the fluidized-bed of the gasification furnace 3, a revolving flow in which the fluidized medium ascends in the intense fluidizing region 42 having an annular area in the peripheral portion of the furnace, and flows in the central portion of the furnace, and then descends in the weak fluidizing region 41 having a central cylindrical area in the central portion of the furnace, is created.

On the other hand, in the combustion furnace 4, the main combustion chamber 6 has furnace bottoms 29, 30 at the lower part thereof, and wind boxes 10, 11 are provided under the furnace bottoms 29, 30. Fluidizing gases 20, 21 are introduced into the wind boxes 10, 11 through supplying ports 15, 16. Further, diffusion devices 34, 35 are provided on the furnace bottoms 29, 30, respectively. A fluidizing gas is ejected from the diffusion device 34 so as to have a substantially low fluidizing velocity, thus forming a weak fluidizing region 43 of the fluidized medium over the furnace bottom 29. A fluidizing gas is ejected from the diffusion device 35 so as to have a substantially high fluidizing velocity, thus forming an intense fluidizing region 44 of the fluidized medium over the furnace bottom 30.

Since the two different fluidizing regions are formed in the fluidized-bed of the main combustion chamber 6, a revolving flow in which the fluidized medium descends in the weak fluidizing region 43 and ascends in the intense fluidizing region 44 is created.

Further, the heat recovery chamber 7 has a furnace bottom 31 at the lower part thereof, and a wind box 12 is provided under the furnace bottom 31. A fluidizing gas 22 is introduced into the wind box 12 through a supplying port 17. Further, a diffusion device 36 is provided on the furnace bottom 31. A fluidizing gas is ejected from the diffusion device 36 so as to have a substantially low fluidizing velocity, thus forming a weak fluidizing region 45 of the fluidized medium over the furnace bottom 31.

As described above, by combining a plurality of different fluidizing regions having different fluidizing velocities, the following flows are created.

In the fluidized-bed of the gasification furnace 3, the fluidized medium descends with a descending flow 55 in the weak fluidizing region 41, and turns its direction in the vicinity of the furnace bottom 27 to a horizontal flow 56 directed to the intense fluidizing region 42, and then turns its direction further to an upward flow 57 in the intense fluidizing region 42, on the other hand, in the vicinity of the surface of the fluidized-bed, the upward flow 57 of the fluidized medium is divided into a flow 58 directed to the central weak fluidizing region 41 and a branched inlet flow 59 passing through the opening 37 of the first partition wall 2 and directed to the combustion furnace 4.

Therefore, in the fluidized-bed of the gasification furnace 3, a revolving flow in which the fluidized medium descends in the weak fluidizing region and ascends in the intense fluidizing region is created, and part of the fluidized medium is introduced into the main combustion chamber 6 of the combustion furnace 4 through the opening 37 at the upper part of the first partition wall.

In the main combustion chamber 6, the weak fluidizing region 43 of the fluidized medium is formed near the upper opening 37, and the intense fluidizing region 44 is formed over the furnace bottom 30. Hence, in the fluidized-bed of the main combustion chamber 6, the fluidized medium descends with the descending flow 60 in the weak fluidizing region 43. Therefore, the fluidized medium containing unburned char and flowing into the main combustion chamber 6 with the branched flow 59 from the gasification furnace 3 is swallowed into the fluidized-bed in the main combustion chamber and the unburned char is completely combusted therein. Then, in the vicinity of the furnace bottom, part of the fluidized medium is returned to the gasification furnace 3 with a return flow 67 passing through the lower opening 38 of the first partition wall 2, and the remainder forms a horizontal flow 61 directed to the intense fluidizing region 44, and then forms an upward flow 62 further in the intense fluidizing region 44. On the other hand, in the vicinity of the surface of the fluidized-bed, the upward flow 62 of the fluidized medium is divided into a flow 63 directed to the weak fluidizing region 43 and a branched inlet flow 64 passing through a space above the second partition wall 5 and directed to the heat recovery chamber 7.

Therefore, in the fluidized-bed of the combustion furnace 4, a flow in which the fluidized medium descends in the weak fluidizing region 43 and ascends in the intense fluidizing region 44 is created, and part of the fluidized medium is introduced into the heat recovery chamber 7 beyond the upper end of the second partition wall 5 and part of the fluidized medium is returned to the gasification furnace 3 through the opening 38 at the lower part of the first partition wall 2.

On the other hand, since the weak fluidizing region 45 is formed in the heat recovery chamber 7, a descending flow 65 of the fluidized medium is formed, and then the fluidized medium is returned to the main combustion chamber 6 with a return flow 66 passing through the lower opening 40 of the second partition wall 5. In this manner, in the fluidized-beds in the gasification furnace 3, the main combustion chamber 6 of the combustion furnace 4, and the heat recovery chamber 7 of the combustion furnace 4, the respective revolving flows are formed therein and a circulating flow is formed between two adjacent fluidized-beds.

Therefore, a combustible material supplying port 47 is provided above the weak fluidizing region 41 of the gasification furnace 3, and combustible material 48 is supplied therethrough to the weak fluidizing region 41. The supplied combustible material is swallowed into the fluidized-bed of the gasification furnace 3 by the descending flow 55, and then uniformly distributed and mixed with the fluidized medium by the revolving flow, and is partially combusted and gasified. The oxygen content of the fluidizing gas supplied to the furnace bottom of the gasification furnace 3 is set to the amount of oxygen equal to or smaller than a theoretical oxygen demand of the supplied combustible material 48. The fluidizing gas comprises any one of air, steam, oxygen and combustion exhaust gas, or a mixture of two or more of them.

Further, the fluidized medium containing unburned char is introduced into the main combustion chamber 6 by the branched flow 59, and swallowed into the fluidized-bed by the descending flow 60, and then uniformly distributed and mixed by the revolving flow, and the unburned char is completely combusted in an oxidizing atmosphere. As shown in FIG. 5, if necessary, a fuel supplying port 68 is provided above the weak fluidizing region 43, and auxiliary fuel 69 may be supplied therethrough to the weak fluidizing region 43.

Further, a plurality of nozzles 53 are provided at the freeboard to supply secondary air 54 for performing complete combustion, when necessary.

The quantity of heat generated by combustion in the main combustion chamber 6 of the combustion furnace 4 is partly introduced into the gasification furnace 3 by the return flow 67 passing through the lower opening 38 of the first partition wall 2 to serve as a heat source for gasification, and is further partly introduced into the heat recovery chamber 7 by the circulating flow in which the fluidized medium enters the heat recovery chamber 7 beyond the second partition wall and returns to the main combustion chamber 6 through the opening 40 whereby part of the quantity of heat generated by combustion in the main combustion chamber 6 is taken out through the heat transfer surfaces 46.

In this manner, the energy of combustible material supplied to the system is partly converted to the gas having chemical energy, and components which are difficult to be gasified are effectively recovered in the combustion chamber 4 as thermal energy at a high efficiency.

Further, combustible material supplied to the furnace contains mostly incombustible material. Therefore, in this embodiment, an incombustible material discharging port 23 is provided between the furnace bottom 28 of the gasification furnace 3 and the furnace bottom 29 of the combustion furnace 4 for discharging incombustible material 25 therethrough. Further, in the case where the auxiliary fuel 69 contains incombustible material, not illustrated in the drawing, incombustible material discharging ports may be provided near the lower part of the second partition wall, and between the furnace bottom of the main combustion chamber and the furnace bottom of the heat recovery chamber for discharging incombustible material therethrough. Further, in order to facilitate discharge of the incombustible material, it is desirable that the respective furnace bottoms have downwardly inclined surfaces which are directed to the discharging port. In the combustion furnace 4, each of the second partition wall 5 forming a boundary between the main combustion chamber 6 and the heat recovery chamber 7 may have an inclined surface inclined toward the main combustion chamber in the main combustion chamber side, and a vertical surface in the heat recovery chamber side, not illustrated in the drawing, but shown in FIG. 10.

Figure 8:
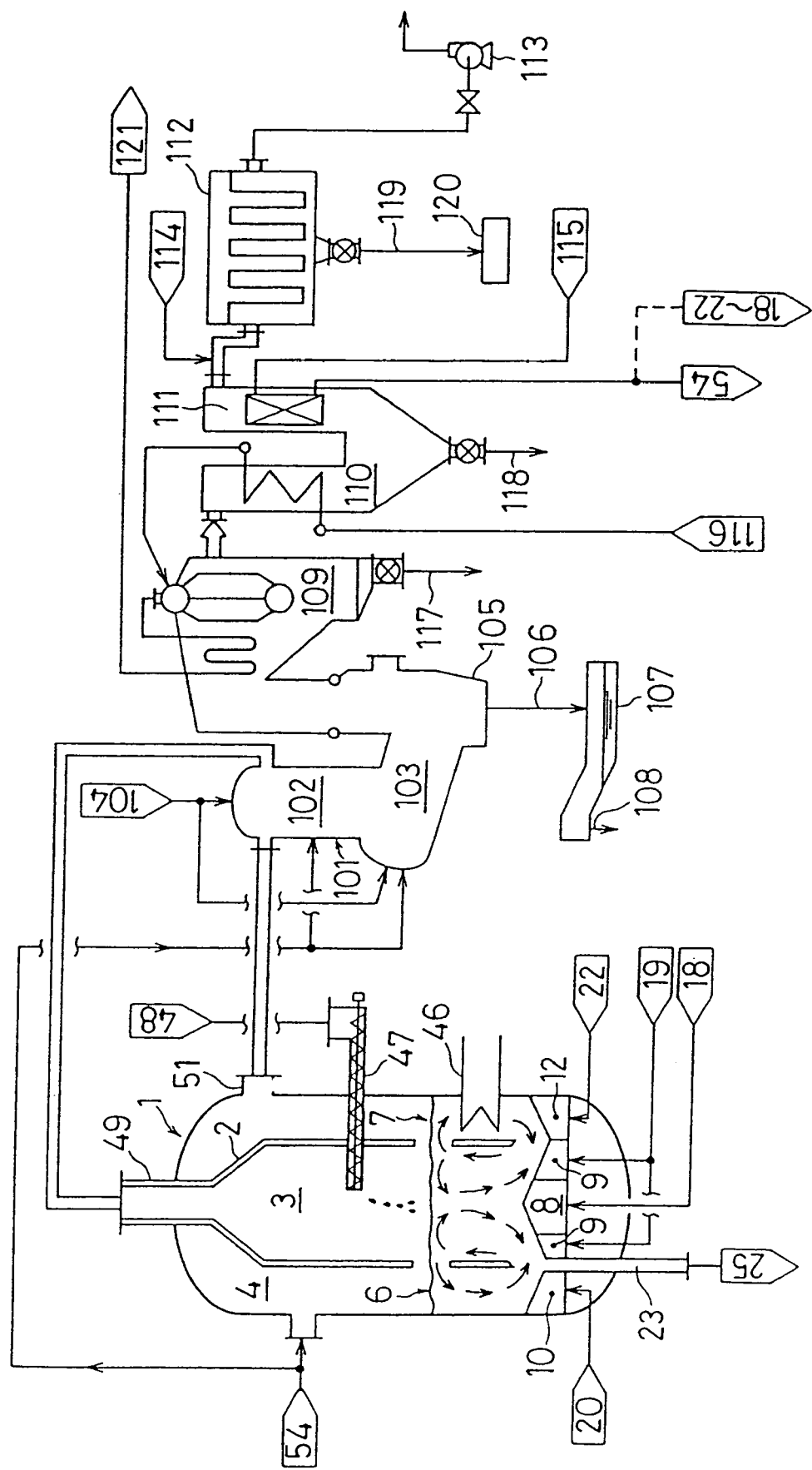
FIG. 8 is a schematic view of a cylindrical fluidized-bed gasification and combustion furnace according to the present invention which is used by being combined with a waste heat boiler and a steam turbine.
Figure 9:
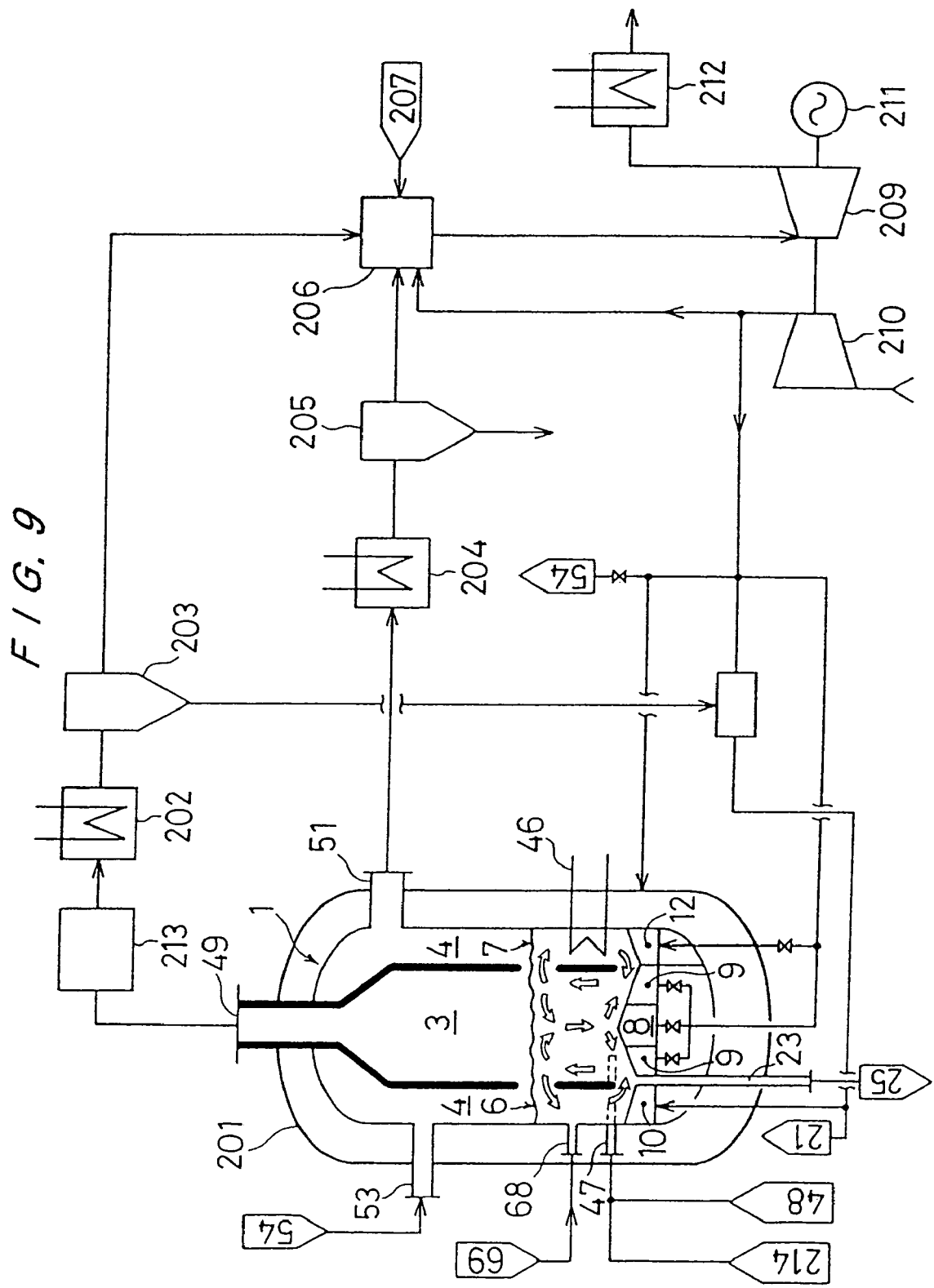
FIG. 9 is a schematic view of a system in which a cylindrical fluidized-bed gasification and combustion furnace according to the present invention is operated under a pressure equal to or higher than an atmospheric pressure.

FIGS. 8 and 9 show a cylindrical fluidized-bed gasification and combustion furnace according to an embodiment of the present invention which is used by being combined with a waste heat boiler and a steam turbine. As shown in FIG. 8, the produced gas discharged from the gas discharging port 49 and the combustion exhaust gas discharged from the gas discharging port 51 of the combustion furnace 4 are led to a slagging combustion furnace 101, and are tangentially blown into a cylindrical primary combustion chamber 102. Auxiliary fuel 104, when necessary, is supplied to the primary combustion chamber 102 and a secondary combustion chamber 103, and oxygen or air or a mixture of oxygen and air is supplied thereto, and the auxiliary fuel 104 is combusted at a temperature ranging from 1200 to 1300° C., or higher. As a result, ashes are melted, and harmful substances such as dioxin or PCB are decomposed at a high temperature. Molten ashes 106 are discharged from the discharging port 105, and quenched in a water chamber 107 to be converted into a slag 108 which is discharged therefrom.

On the other hand, combustion gas having a high temperature discharged from the slagging combustion furnace 101 is cooled by a waste heat boiler 109, an economizer 110 and an air preheater 111 one by one, and is discharged to the atmosphere via a dust collector 112 and an induced draft fan 113. A neutralizer 114 such as slaked lime, if necessary, is added to the combustion gas discharged from the air preheater 111 at the inlet of the dust collector 112.

Further, boiler feedwater 116 is converted into a superheated steam 121 in the waste heat boiler 109 via the economizer 110, and the superheated steam 121 drives a steam turbine. Further, gas 115 for combustion comprises oxygen or air or a mixture of oxygen and air, and is heated by the air preheater 111, and then supplied to the slagging combustion furnace 101 and the freeboards of the combustion furnace 4. Further, not illustrated in the drawing, it is possible to use the gas 115 as the fluidizing gases 18-22. Further, steam obtained by the immersed heat transfer tubes 46 drives a medium-pressure turbine or a low-pressure turbine.

Further, not illustrated in the drawing, ashes 117, 118 discharged from the waste heat boiler 109, the economizer 110 and the air preheater 111 may be returned to the combustion furnace 4.

On the other hand, fly ash 119 collected by the dust collector 112, if it contains alkali metal salt such as vaporized Na or K, is treated by chemicals in treatment equipment 120.

FIG. 9 is a view of a fluidized-bed gasification and combustion furnace according to an embodiment of the present invention which is operated under a pressure equal to or higher than an atmospheric pressure.

Though not illustrated in FIG. 9, a fluidized-bed furnace 1 may have itself a pressure-tight structure. However, since the structure in which a heat-resisting function and a pressure-tight function are separated from each other is advantageous, in this embodiment, the fluidized-bed furnace 1 is housed in a pressure vessel 201, and the gasification furnace 3 and the combustion furnace 4 can be operated under a pressure equal to or higher than an atmospheric pressure.

The discharging port 51 for discharging the combustion gas from the combustion furnace 4, the discharging port 49 for discharging the produced gas from the gasification furnace 3, the combustible material supplying port 47 of the gasification furnace 3, the secondary air supplying port 53 of the combustion furnace 4, the fluidizing gas supplying lines, and the incombustible material discharging line, and the like pass through the pressure vessel 201.

In this embodiment, combustible material 48 is supplied to the gasification furnace 3, and is gasified by partial combustion. The method for supplying the combustible material is carried out by a screw feeder shown in the drawing, and may be carried out by pneumatic transportation. Alternatively, combustible material may be supplied in a slurry condition.

Unburned char generated in the gasification furnace 3 and accompanied by produced gas is cooled to a temperature of 600° C. or lower in a gas cooling apparatus 202 provided at the subsequent stage, and alkali metal such as Na or K which will cause hot corrosion of gas turbine blades, for example, is solidified or deposited onto surfaces of particles. The solidified particles or the deposited particles are collected by a dust collector 203, and the collected particles are introduced into the combustion furnace 4 and completely combusted therein. The combustion exhaust gas discharged from the combustion furnace 4 passes through the pressure vessel 201, and is cooled to a temperature of 600° C. or lower in the gas cooling apparatus 204 at the subsequent stage. By this cooling, alkali metal such as Na or K is solidified or deposited onto surfaces of particles, and the solidified particles or the deposited particles are collected by the dust collector 205 and discharged therefrom. The dust collectors 203, 205 may comprise a ceramic filter in many cases, but other types of dust collectors may be used.

The combustion gas which has been purified by removing Na or K which will cause hot corrosion, and the produced gas which has been purified by removing dust with the dust collector 203 downstream of the gasification furnace 3 are mixed and combusted in the combustor 206. In this case, the respective gases are cooled, and therefore thermal energy which is brought in the combustor 206 is lowered due to this gas cooling. Thus, in order to combust the gases in the combustor 206 at a high temperature, the combustion furnace 4 is operated at an excess air ratio as small as possible to thereby reduce the amount of combustion exhaust gas. Oxygen required for combustion in the combustor 206 is separately supplied to the combustor 206 as oxygen 207.

The combustion exhaust gas having a high temperature and a high pressure discharged from the combustor 206 drives a gas turbine 209 at a high efficiency. The gas turbine 209 drives a compressor 210 and a generator 211.

The exhaust gas discharged from the gas turbine 209 is cooled in a heat recovery apparatus 212, and then discharged to the atmosphere. Incidentally, in this embodiment, if material of turbine blades is improved, then the gas cooling apparatuses 202, 204 may be removed.

On the other hand, in case of using coal as combustible material 48, desulfurizing reaction is carried out in the furnace by mixing the combustible material 48 with limestone 214 or supplying the limestone 214 separately to the furnace. That is, hydrogen sulfide $H_2S$ generated in the gasification furnace 3 reacts with CaO to produce CaS by desulfurizing reaction, and the produced CaS accompanied by the produced gas is supplied to the dust collector 203, and then CaS is collected in the dust collector 203 and supplied to the main combustion chamber 6.

Further, the fluidized medium containing unburned char and CaS is introduced into the main combustion chamber 6 by a branched flow passing through the opening at the upper portion of the first partition wall of the gasification furnace 3, and is swallowed into the fluidized-bed by a descending flow, and uniformly distributed and mixed. The unburned char is completely combusted in an oxidizing atmosphere, while CaS is converted into $CaSO_4$, and the converted $CaSO_4$ accompanied by combustion exhaust gas is supplied to the dust collector 205. In the dust collector 205, $CaSO_4$ is collected and discharged therefrom. In the case where the desulfurizing reaction is insufficiently performed in the gasification furnace 3, an additional desulfurizing apparatus 213 may be provided downstream of the gasification furnace.

Figure 10:
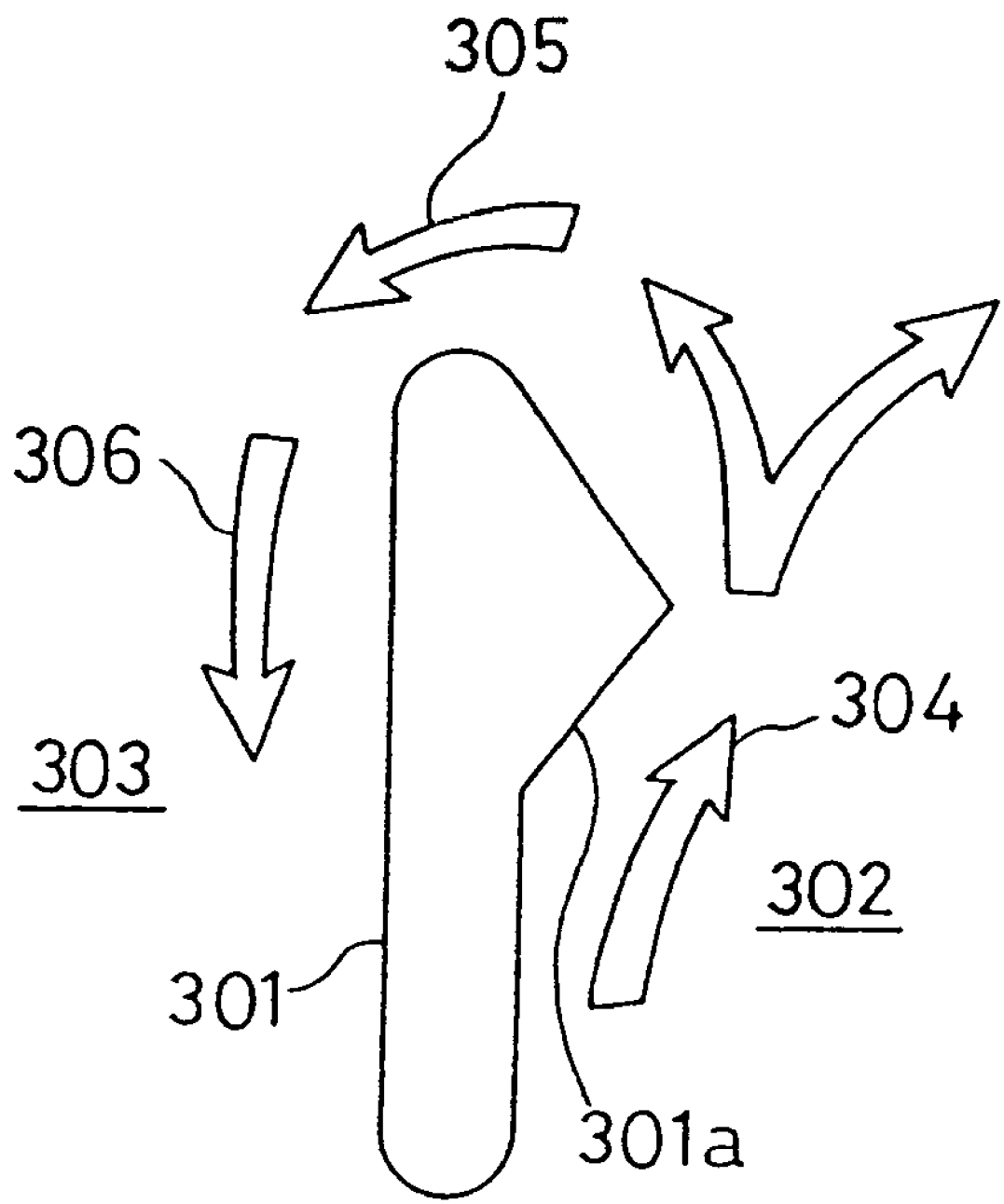
FIG. 10 is a cross-sectional view showing a detailed structure of a first partition wall and a second partition wall according to the present invention.

FIG. 10 shows an example of the structure of the partition wall. The partition wall 301 has an inclined surface 301a for deflecting an upward flow 304 formed in an intense fluidizing region 302, and a vertical surface on the opposite side of the inclined surface 301a so that a branched flow 305 beyond the upper end of the partition wall is not stagnated and descends in the weak fluidizing region 303 with a descending flow 306. This structure may be applied to both of the first partition wall and the second partition wall according to the present invention. Incidentally, in the embodiments shown in FIGS. 1 through 9, the first partition wall and the second partition wall may have a vertical wall without having an inclined surface.

Figure 11:
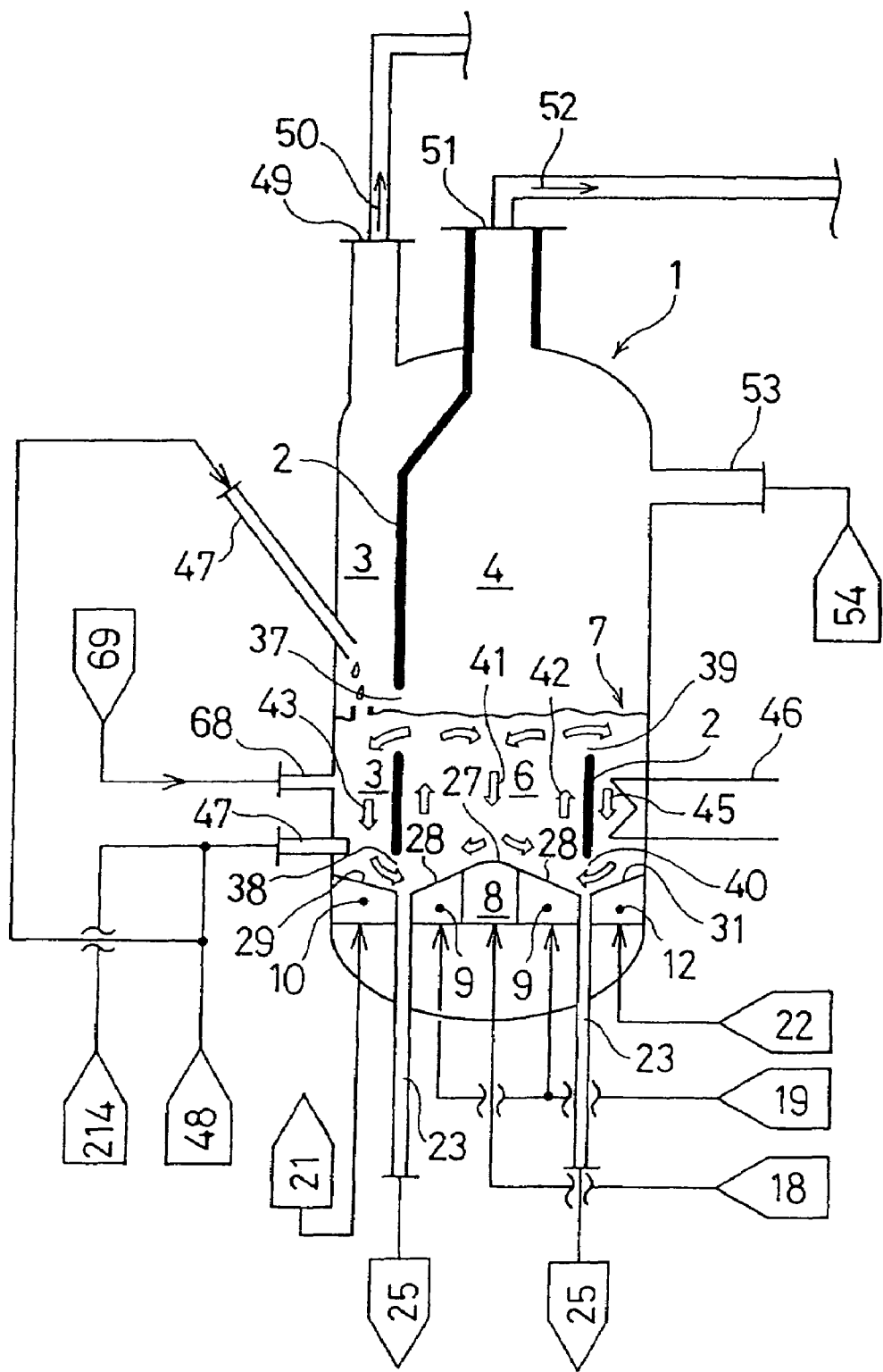
FIG. 11 is a vertical cross-sectional view of a cylindrical fluidized-bed gasification and combustion furnace.
Figure 12:
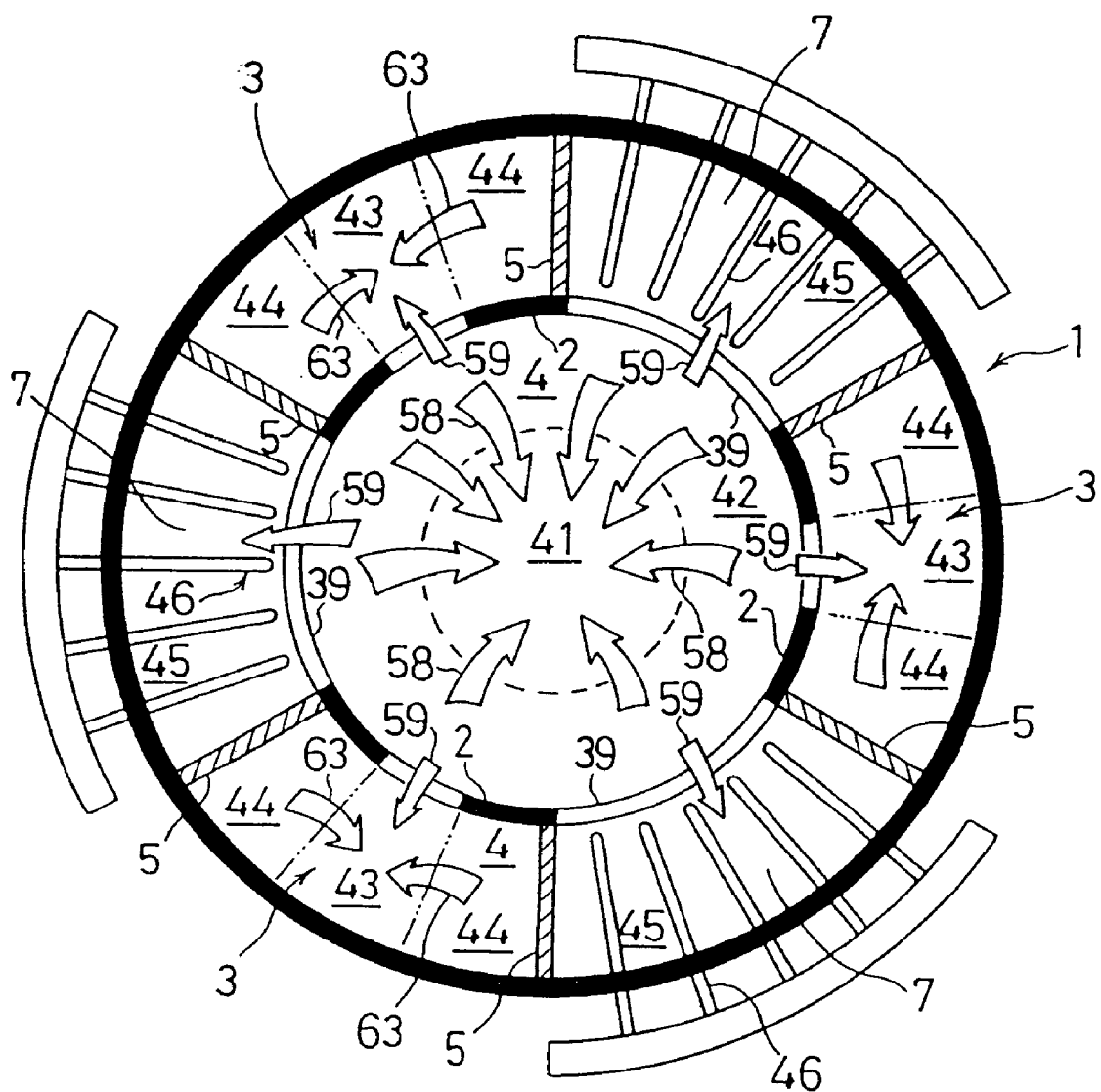
FIG. 12 is a horizontal cross-sectional view of a fluidized-bed portion.

Next, a cylindrical fluidized-bed gasification and combustion furnace according to another embodiment of the present invention will be described below with reference to FIGS. 11 and 12. FIG. 11 is a vertical cross-sectional view of a cylindrical fluidized-bed gasification and combustion furnace. FIG. 12 shows a horizontal cross-section of the fluidized-bed portion. In the embodiment shown in FIGS. 11 and 12, elements (or components) having the same or similar functions as the elements (or components) in the embodiment shown in FIGS. 6 and 7 will be described using the same reference numerals.

An interior of a cylindrical fluidized-bed furnace 1 is divided into a central circular combustion furnace 4 and an annular furnace surrounding the combustion furnace 4 by a first partition wall 2 which is concentric with an outer wall of the furnace. The annular furnace is divided into a plurality of gasification furnaces 3 and a plurality of heat recovery chambers 7 by a plurality of second partition walls 5 extending radially. The first partition wall 2 has a plurality of upper rectangular openings 37 and a plurality of lower rectangular openings 38, and the gasification furnace 3 and the combustion furnace 4 communicate with each other through the upper and lower openings 37, 38.

The gasification furnace 3 has a gas discharging port 49 from which a produced gas 50 is discharged to the outside. Further, the first partition wall 2 divides the combustion furnace 4 into a main combustion chamber 6 and heat recovery chambers 7 only in a fluidized-bed portion. However, the main combustion chamber 6 and the heat recovery chambers 7 are integrated in a freeboard section. Therefore, combustion exhaust gases discharged from the respective chambers are mixed with each other in the freeboard section, and are then discharged as a combustion exhaust gas, 52 from a gas discharging port 51 to the outside. Heat transfer surfaces 46 are immersed in the fluidized-bed in each of the heat recovery chambers 7 to recover heat from the fluidized medium in the fluidized-bed. Further, the first partition wall 2 has lower openings 40, and the fluidized medium can move between the main combustion chamber 6 and the heat recovery chambers 7 through the lower openings 40 and upper openings 39.

The combustion furnace 4 has a furnace bottom 27 at the lower central part thereof and an annular furnace bottom 28 so as to surround the furnace bottom 27, and wind boxes 8, 9 are provided under the furnace bottoms 27, 28. Fluidizing gases 18, 19 are introduced into the wind boxes 8, 9 through respective supplying ports.

On the other hand, diffusion devices 32, 33 are provided on the furnace bottoms 27, 28, respectively in the same manner as the embodiment shown in FIG. 6. A fluidizing gas is ejected from the diffusion device 32 so as to have a substantially low fluidizing velocity, thus forming a weak fluidizing region 41 of the fluidized medium over the furnace bottom 27. A fluidizing gas is ejected from the diffusion device 33 so as to have a substantially high fluidizing velocity, thus forming an intense fluidizing region 42 of the fluidized medium over the furnace bottom 28.

Since the two different fluidizing regions are formed in the fluidized-bed of the combustion furnace 4, a revolving flow in which the fluidized medium ascends in the intense fluidizing region 42 having an annular area in the peripheral portion of the furnace, and flows in the central portion of the furnace, and then descends in the weak fluidizing region 41 having a central circular area in the central portion of the furnace is created.

Further, in the gasification furnace 3 and the heat recovery chamber 7, they have furnace bottoms 29, 31 at the lower parts thereof, and wind boxes 10, 12 are provided under the furnace bottoms 29, 31. Fluidizing gases 20, 21 are introduced into the wind boxes 10, 12 through respective supplying ports. Further, diffusion devices 34, 36 are provided on the furnace bottoms 29, 31, respectively in the same manner as the embodiment shown in FIG. 5. A fluidizing gas is ejected from the diffusion device 34 so as to have a substantially low fluidizing velocity, thus forming a weak fluidizing region 43 of the fluidized medium over the furnace bottom 29. A fluidizing gas is ejected from the diffusion device 36 so as to have a substantially high fluidizing velocity, thus forming an intense fluidizing region 45 of the fluidized medium over the furnace bottom 31.

By the above arrangement, the following flows of fluidized medium are created.

In the fluidized-bed of the gasification furnace 3, the fluidized medium descends with a descending flow in the weak fluidizing region 43, and in the vicinity of the furnace bottom 29, the fluidized medium flows in the combustion furnace 4 through the lower opening 38.

In the fluidized-bed of the main combustion chamber 6 of the combustion furnace 4, the fluidized medium descends with a descending flow in the weak fluidizing region 41, and turns its direction in the vicinity of the furnace bottom 27 to a horizontal flow directed to the intense fluidizing region 42, and then turns its direction further to an upward flow in the intense fluidizing region 42. Further, the upward flow of the fluidized medium is blanched in the vicinity of the surface of the fluidized-bed into a flow directed to the central weak fluidizing region 41, a branched return flow passing through the opening 37 of the first partition wall 2 and directed to the gasification furnace 3, and a branched inlet flow passing through the upper opening 39 of the first partition wall 2 and directed to the heat recovery chamber 7.

Therefore, in the fluidized-bed of the combustion furnace 4, a revolving flow in which the fluidized medium descends in the weak fluidizing region and ascends in the intense fluidizing region is created, and part of the fluidized medium is introduced into the gasification furnaces 3 and the heat recovery chambers 7 through the openings 37 at the upper part of the first partition wall and the upper openings 39. As described above, the fluidized medium flowing in the gasification furnace 3 descends with a descending flow.

On the other hand, in the heat recovery chamber 7, the weak fluidizing region 45 is formed to create a descending flow of the fluidized medium, and the fluidized medium is then returned to the main combustion chamber 6 with a return flow passing through the lower opening 40 of the first partition wall 2.

Therefore, a combustible material supplying port 47 is provided above the weak fluidizing region 43 of the gasification furnace 3, and combustible material 48 is supplied therethrough to the weak fluidizing region 43. The supplied combustible material is swallowed into the fluidized-bed of the gasification furnace 3 by the descending flow, and partially combusted and gasified. Further, a combustible material supplying port 47 is formed slightly above the furnace bottom.

A single combustible material supplying port 47 is usually provided with respect to a single gasification furnace. However, in the case of a big scale furnace, the gasification furnace is large in size, and fuel is not sufficiently distributed in the gasification furnace. In that case, the furnace bottom of the gasification furnace is divided to allow the intensity of fluidization of the fluidized medium to be changed locally, so that distribution of fuel may be accelerated by creating an internally revolving flow with, for example, formation of a weak fluidizing region and an intense fluidizing region of the fluidized medium in the gasification furnace.

FIG. 12 shows an example in which a furnace bottom of the gasification furnace is radially divided into three segments, and a weak fluidizing region 43 is formed at a central portion of the furnace and intense fluidizing regions 44 are formed at both end portions of the furnace. In this case, combustible material is supplied to the central fluidizing region 43, and pyrolized and gasified while it is descending, and then moved at the lower portion of the weak fluidizing region 43 to the intense fluidizing regions 44 located at both sides of the weak fluidizing region 43. The combustible material turns its direction in the intense fluidizing regions 44 to upward flows, and then turns its direction again in the upper part of the fluidized-bed and flows in the central weak fluidizing region 43 as shown by arrows 63.

It is desirable to increase the amount of fluidized medium in the return flows 59 which flow from the main combustion chamber 6 to the gasification furnaces 3, because the quantity of heat required for gasification is supplied to the gasification furnaces 3 by the fluidized medium as sensible heat. Therefore, it is desirable that the upper openings 37 of the first partition wall between the main combustion chamber 6 and the gasification furnaces 3 are provided all around the gasification furnaces to enlarge their opening areas. However, in case of forming the weak fluidizing region 43 and the intense fluidizing region 44 in each of the gasification furnace, it is effective that the upper opening 37 is provided only in the weak fluidizing region. In this method, lowering of the gasification efficiency caused by the fact that combustible material which is not sufficiently pyrolized and gasified flows into the main combustion chamber and is combusted therein can be suppressed.

On the other hand, the fluidized medium containing unburned char in the gasification furnace 3 passes through the lower opening 38 and is introduced into the main combustion chamber 6, and then uniformly distributed and mixed by a revolving flow and completely combusted in an oxidizing atmosphere. As shown in FIG. 11, if necessary, a fuel supplying port 68 is provided above the weak fluidizing region 43, and auxiliary fuel 69 may be supplied therethrough to the gasification furnace 3.

Further, a plurality of nozzles 53 are provided at the freeboard to supply secondary air 54 for performing complete combustion, if necessary.

The quantity of heat generated by combustion in the main combustion chamber 6 of the combustion furnace 4 is partly introduced into the gasification furnace 3 by the return flow passing through the upper opening 37 of the first partition wall 2 to serve as a heat source for gasification, and is further partly introduced into the heat recovery chamber 7 by the circulating flow in which the fluidized medium enters the heat recovery chamber 7 beyond the first partition wall 2 and returns to the main combustion chamber 6 through the lower opening 40 whereby part of the quantity of heat generated by combustion in the main combustion chamber 6 is taken out by the heat transfer surfaces 46.

In this manner, the energy of combustible material supplied to the system is partly converted to the production gas having chemical energy, and components which are difficult to be gasified are effectively converted to thermal energy for high efficiency recovery.

Further, combustible material supplied to the furnace contains mostly incombustible material. Therefore, in this embodiment, an incombustible material discharging port 23 is provided between the furnace bottom 28 of the combustion furnace 4 and the furnace bottom 29 of the gasification furnace 3, and an incombustible material discharging port 23 is provided between the furnace bottom 28 of the combustion furnace 4 and the furnace bottom 31 of the heat recovery chamber 7 for discharging incombustible material 25 therefrom.

As described above, in, the main combustion chamber 6, the fluidizing velocity in the central portion of the chamber is lower than that in the peripheral portion of the chamber. Hence, an internally revolving flow in which the fluidized medium is intensely fluidized and blown up in the peripheral portion and a descending moving bed is formed in the central portion is created.

By this arrangement, the fluidized medium having a high temperature in the main combustion chamber 6 can easily enter into the gasification furnace 3 through the first partition wall 2, the quantity of heat required for gasification can be easily supplied, and diffusion of heat in the main combustion chamber 6 (in which an exothermic reaction is performed) can be accelerated. Therefore, high temperature regions are less susceptible to being generated locally, and generation of agglomeration can be suppressed.

By forming a relatively mild fluidized-bed in the entire area of the gasification furnace 3, unreacted char can be prevented from being carried over from the furnace and gasification reaction can be performed effectively. If the fluidized medium flows sufficiently into the gasification furnace 3 from the main combustion chamber 6, then the fluidizing gas in the gasification furnace 3 is not required to contain oxygen at all, and in such case, an exothermic reaction does not take place in the gasification furnace 3 and the formation of agglomeration is entirely suppressed.

In the heat recovery chamber 7, a relatively mild fluidized-bed is formed. When there is a possibility of generation of agglomeration, oxygen concentration of the fluidizing gas is lowered, or the fluidized medium is fluidized by supplying gas containing no oxygen.

A freeboard section of the heat recovery chamber 7 and a freeboard section of the main combustion chamber 6 may be integrated with each other. In such a case, secondary air, when necessary, may be blown into the freeboard section for accelerating complete combustion. If oxygen concentration is nearly zero in the upper portion of the heat recovery chamber 7 by decreasing oxygen concentration of fluidizing gas in the heat recovery chamber 7, the freeboard section of the heat recovery chamber 7 and the freeboard section of the gasification furnace 3 may be integrated with each other.

In the case that char is accumulated in the furnace due to the kind of combustible material used, the method in which oxygen concentration in the fluidizing gas is gradually increased in the order of the peripheral portion of the main combustion chamber 6, the central portion of the main combustion chamber 6, the heat recovery chamber 7, and the gasification furnace 3 may be effective. Conversely, if the combustible material is such a kind that char is not accumulated, the gasification reaction can be effectively carried out by lowering oxygen concentration gradually in the order of the gasification furnace 3, the heat recovery chamber 7, the central portion of the main combustion chamber 6 and the peripheral portion of the main combustion chamber 6.

Figure 13:
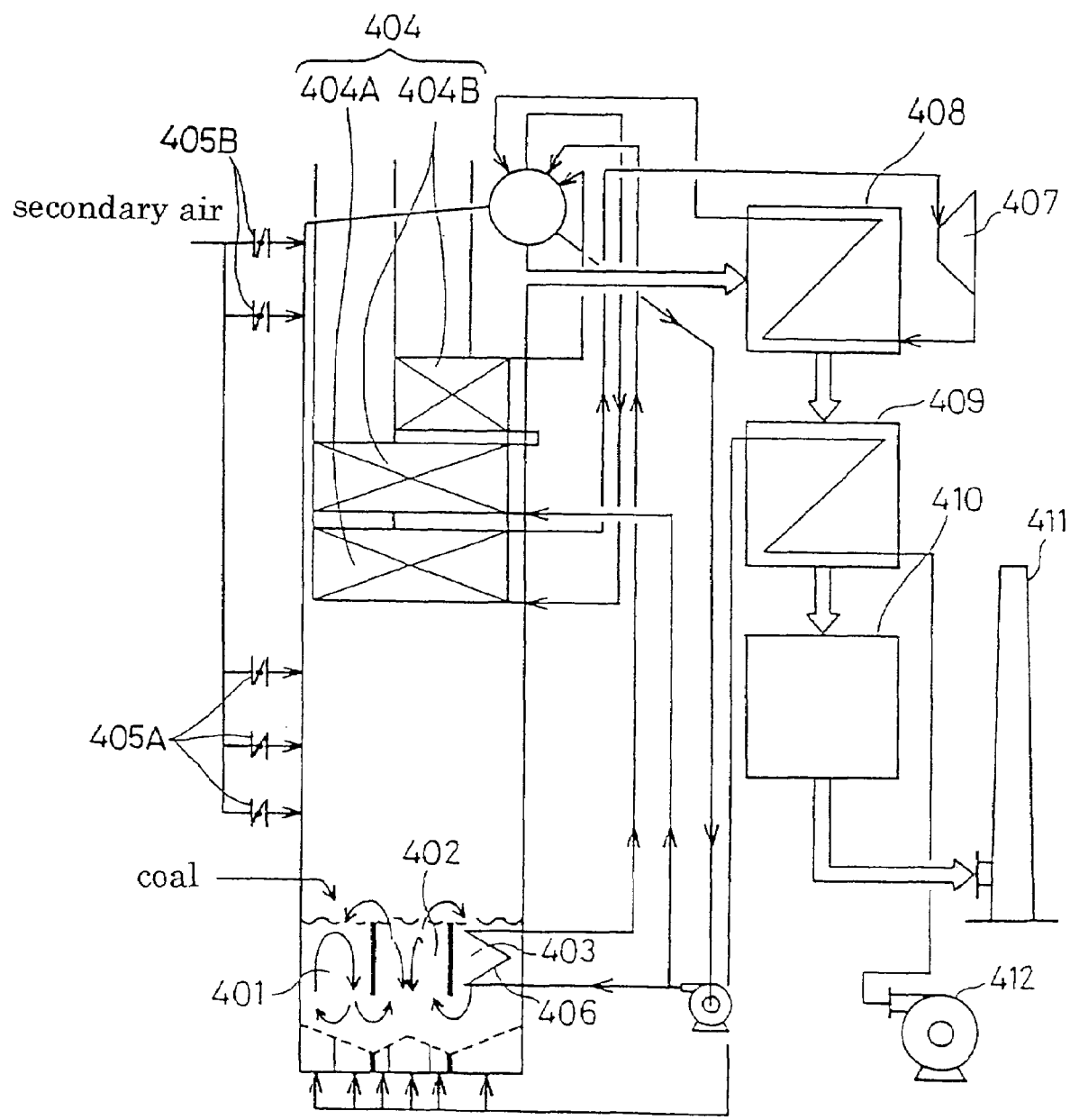
FIG. 13 is a vertical cross-sectional view of an atmospheric fluidized-bed coal boiler which is a kind of fluidized-bed gasification and combustion furnace according to the present invention.
Figure 14:
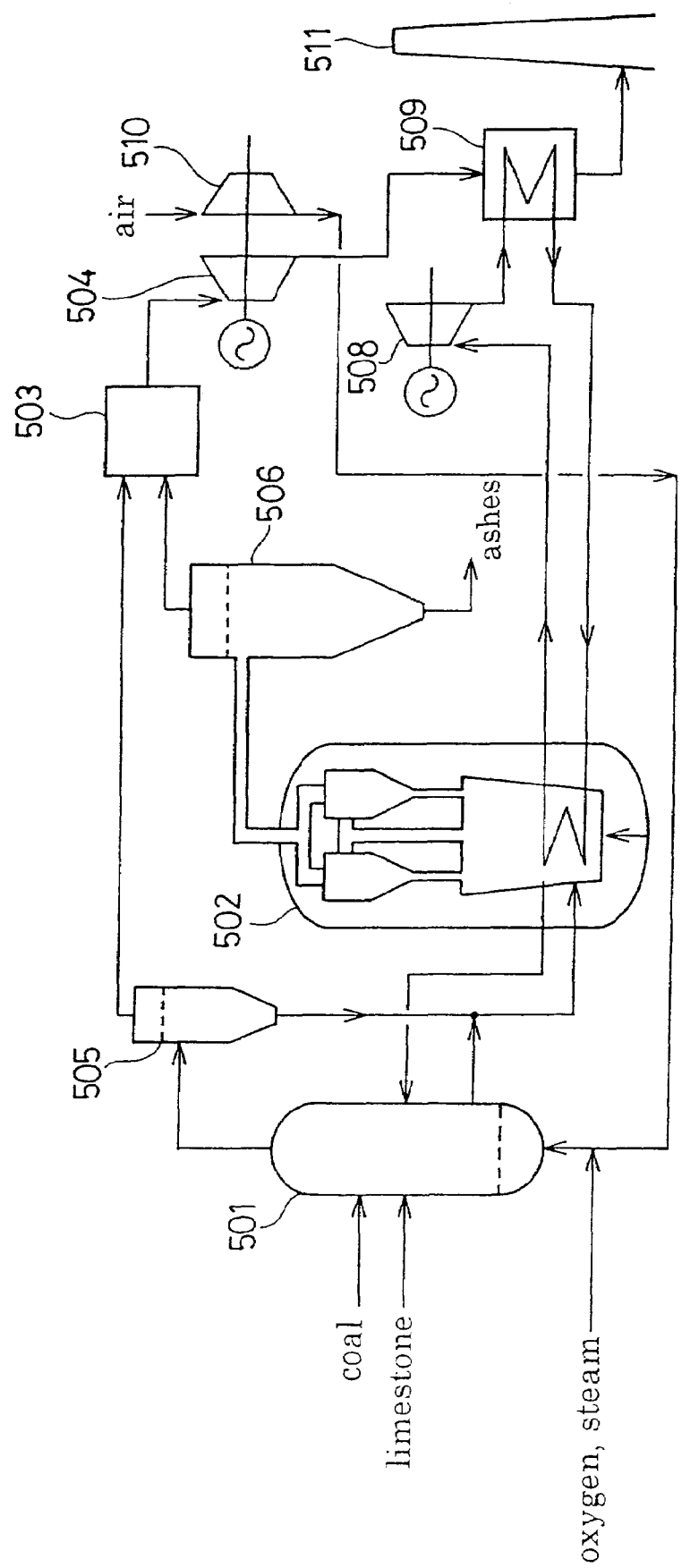
FIG. 14 is a schematic view of a topping-cycle system incorporating a conventional pressurized combustion furnace.
Figure 15:
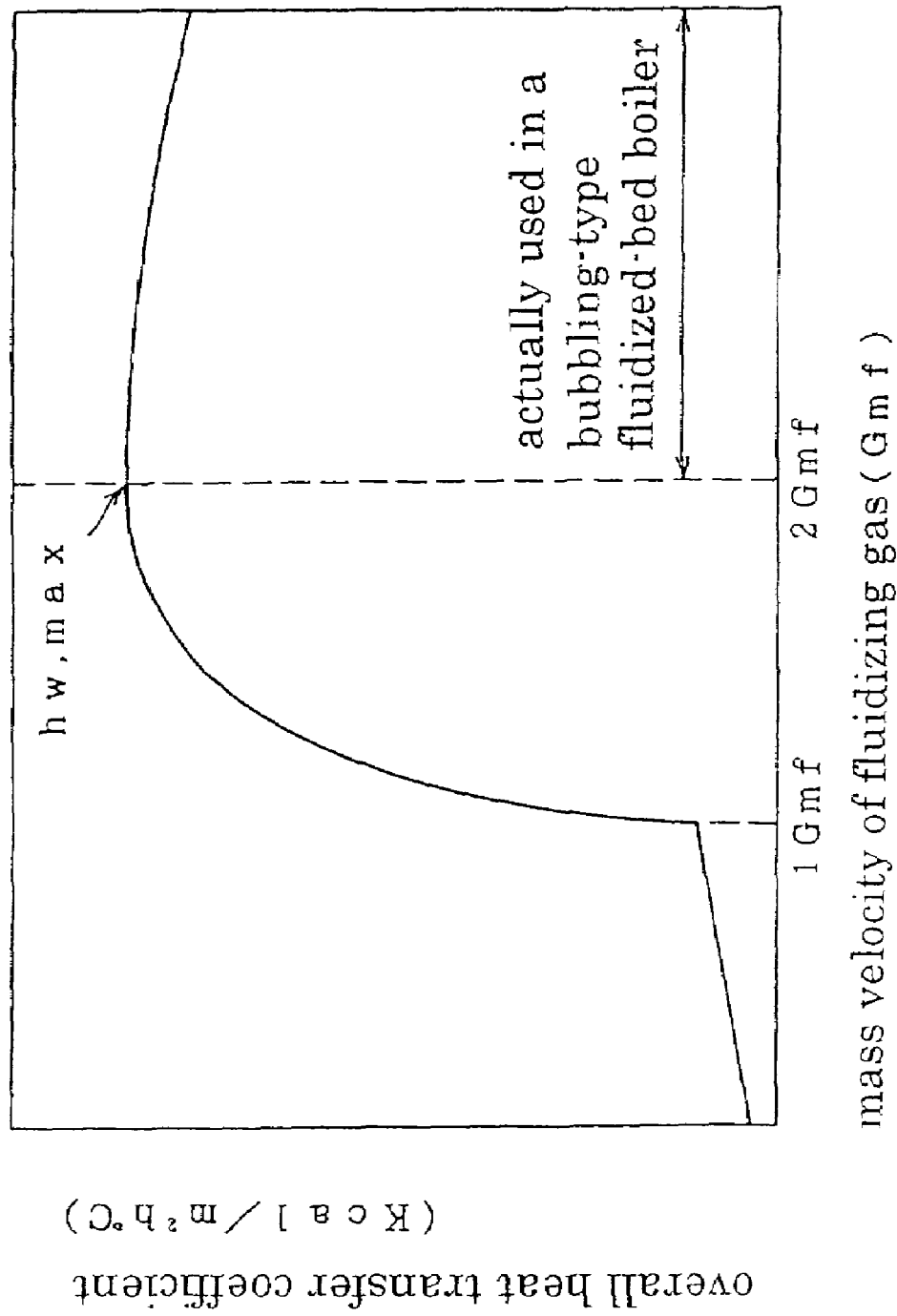
FIG. 15 is a graph showing the relationship between the heat transfer coefficient of the immersed heat transfer tubes and the mass velocity of fluidizing gas.
Figure 16:
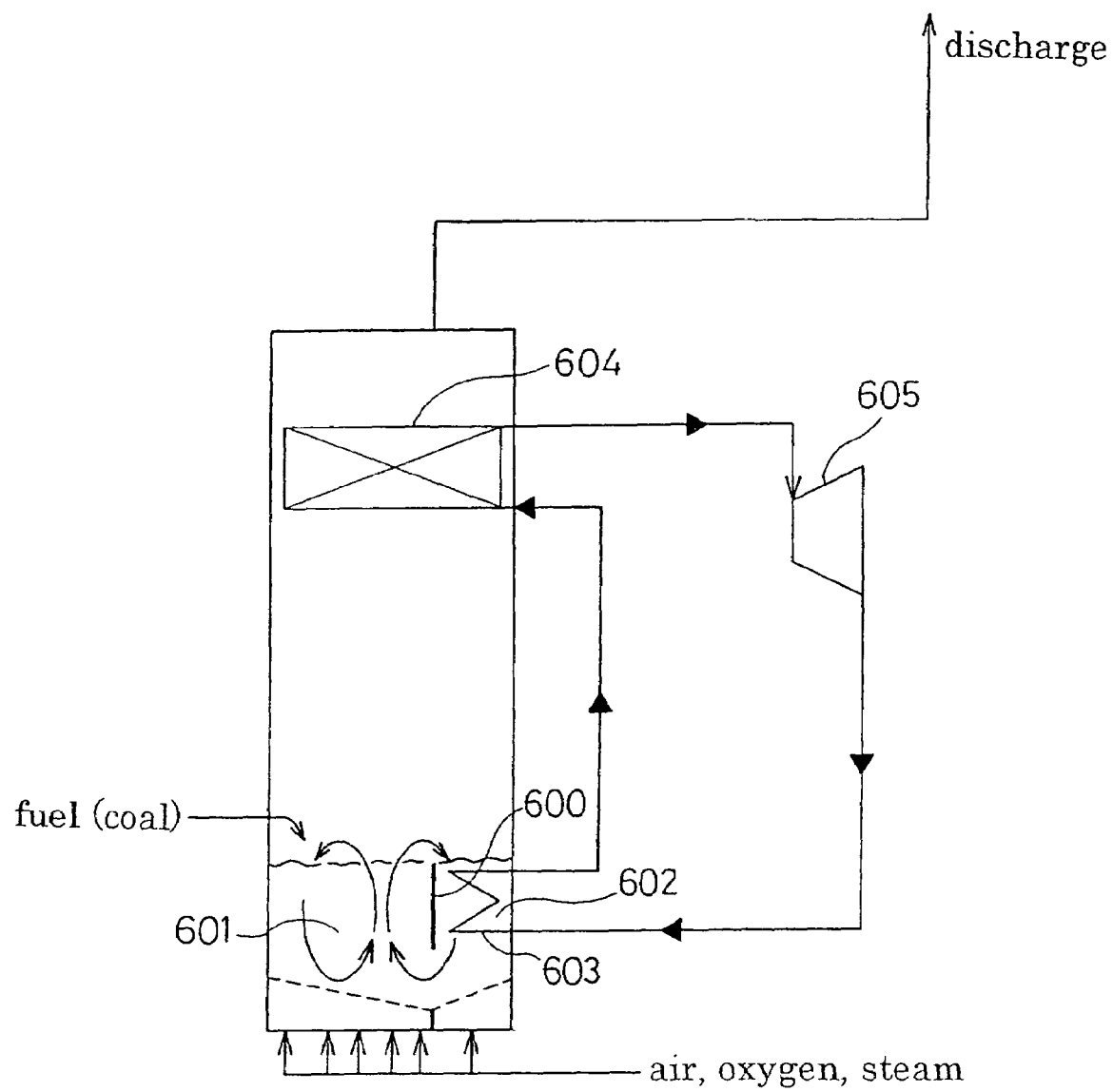
FIG. 16 is a schematic view of a conventional fluidized bed coal boiler.

FIG. 13 is a schematic view of an atmospheric fluidized-bed coal boiler which is a kind of a fluidized-bed gasification and combustion furnace according to an embodiment of the present invention. As shown in FIG. 13, the interior of the fluidized-bed coal boiler is divided into three chambers, i.e. a gasification chamber 401, a combustion chamber 402 and a heat recovery chamber 403, and fuel is supplied to the gasification chamber 401, and pyrolized and gasified therein. The combustion chamber 402 is provided adjacent to the gasification chamber 401, and the heat recovery chamber 403 is provided adjacent to the combustion chamber 402. In the case where the present invention is applied to the atmospheric fluidized-bed coal boiler, the freeboard section is integrated above the gasification chamber 401, the combustion chamber 402, and the heat recovery chamber 403, and does not partition the chambers from one another. Heat transfer surfaces 406 for collecting heat from the fluidized medium are provided in the heat recovery chamber 403. In the freeboard section, there are provided heat transfer surfaces 404 in which a steam superheater 404A and an evaporator 404B are provided along a gas flow. A plurality of secondary air supply nozzles 405A, 405B are provided on the wall of the freeboard section in different vertical and horizontal locations. Steam produced by collection of heat through the heat transfer surfaces 404, 406 is led to a steam turbine 407, and drives the steam turbine 407.

On the other hand, the combustion exhaust gas discharged from the fluidized-bed coal boiler is discharged from a stack 411 through an economizer 408, an air preheater 409 and a bag filter 410. Further, air supplied from a blower 412 is heated by the air preheater 409, and is then supplied into the furnace from the bottom of the fluidized-bed boiler as a fluidizing gas and a gas for combustion.

The fluidizing gas for the gasification chamber 401, the combustion chamber 402, and the heat recovery chamber 403 is air, and the amount of air supplied to the gasification chamber 401 is in the range of 10 to 20% of a theoretical air demand of the supplied fuel. It is desirable to supply the amount of air to the gasification chamber 401 so that the sum of the quantity of heat required for gasification and the quantity of heat taken out from the bed as sensible heat of gas is slightly larger than the quantity of heat generated by combustion. If the supplied air is such amount, the quantity of heat which is insufficient for thereby maintaining the bed temperature of the gasification chamber 401 can be supplemented by the quantity of heat held by the fluidized medium which flows into the gasification chamber 401 from the combustion chamber 402 adjacent to the gasification chamber 401, and hence the control of the bed temperature of the gasification chamber 401 can be easily performed. Incidentally, not shown in the drawing, the flow rate and composition of the fluidizing gas supplied to the gasification chamber 401, the combustion chamber 402 and the heat recovery chamber 403 can be independently controlled. The fluidizing gas may comprise air to which at least one of oxygen and steam is added.

The gasification chamber 401 is kept at a temperature ranging from 800 to 950° C., and fuel supplied to the gasification chamber 401 is partially combusted, pyrolized and gasified, and then a mixed gas of combustible gas and combustion gas generated by partial combustion is led to the freeboard section at the upper portion of the gasification chamber 401. On the other hand, unreacted char remaining in the bed flows into the combustion chamber 402 by particle circulation between the gasification chamber 401 and the combustion chamber 402, and is completely combusted therein. The amount of air supplied to the combustion chamber 402 is slightly larger than the amount of air of a theoretical air demand of char flowing thereinto. Specifically, air of about 110 to 120% of a theoretical air demand of the char is supplied for thereby accelerating combustion of char in the bed having a high temperature, and the fluidized medium having a low temperature, when necessary, can be supplied from the heat recovery chamber 403 so that the fluidized-bed can be maintained at a temperature ranging from 800 to 900° C. optimum for desulfurizing reaction and a low NOx combustion.

If the furnace is operated under the above condition, the total air ratio supplied to the fluidized-bed portions (the gasification chamber 401, the combustion chamber 402 and the heat recovery chamber 403), though depending on the kind of coal, especially fuel ratio, is in the range of about 70 to 90%, the combustion reaction of the remaining 10 to 30% of combustibles is performed in the freeboard. Therefore, a plurality of supplying ports for secondary air to the freeboard are provided, and when necessary, by changing the locations of the supplying ports of the secondary air, the temperature of the freeboard can be easily controlled.

For example, as for the coal in which the combustion rate in the bed is high and the gas temperature in the freeboard is liable to be lowered, by supplying secondary air 405B to a portion above the steam superheater tubes 404A and the evaporator tubes 404B, the collection of heat by the heat transfer tubes 404 in the freeboard can be suppressed and the temperature of combustion gas from the boiler can be properly maintained. Conversely, as for the coal having a low combustion rate in the bed, secondary air 405A is supplied to a space between the heat transfer tubes 406 provided in the fluidized-bed portion and the heat transfer tubes 404 provided in the freeboard for thereby combusting, and then heat is collected by the heat transfer tubes in the freeboard, thereby making up for the shortage of heat collection in the bed. As for the medium coal, the ratio of the secondary air 405B and the secondary air 405A supplied to the portions above and below the heat transfer tubes provided in the freeboard is adjusted while observing the gas temperature at the exit of the boiler for thereby adjusting combustion in the boiler in an optimum condition.

Further, the above structure allows an installation area of the fluidized-bed boiler to be reduced. In the case where the fuel having a high in-bed combustion rate is combusted in the normal fluidized-bed combustion furnace, the quantity of heat to be collected in the bed is too large, and therefore a large heat transfer area in the bed is required. As a result, the fluidized-bed portion requires a large horizontal cross-sectional area for arrangement of the immersed heat transfer tubes, thus increasing an installation area of the fluidized-bed boiler. However, since the atmospheric fluidized-bed coal boiler to which the present invention is applied can suppress combustion in the bed and accelerate combustion in the freeboard, it is possible to increase the ratio of heat transfer surfaces provided in the freeboard to the total heat transfer surfaces. Consequently, the boiler has a vertically elongated structure and is capable of decreasing a horizontal cross-sectional area, Therefore, an installation area of the boiler can be reduced.

As described above, in the embodiments shown in FIGS. 1 through 13, the elements having the same effect and function are represented using the same reference numerals throughout the views.

As described above, the present invention offers the following advantages.

(1) Since char is completely combusted after gasification by partial combustion, even if combustible material is difficult to be gasified and generates a large amount of char, such combustible material can still be utilized by the features of the gasification and slagging combustion system and so on.

(2) The gasification furnace and the combustion furnace are integrated with each other to allow the whole structure to be compact.

(3) The unreacted char can be easily transferred and the control of its transportation can be easily performed. That is, since the gasification furnace and the combustion furnace are integrated into a single structure, the transfer of char from the gasification furnace to the combustion furnace can be performed without complicated mechanical equipment such as pipes and L-shaped valves, and the amount of transferred char is controlled by changes of the fluidizing velocity in the gasification furnace and the combustion furnace, thus facilitating and simplifying the transfer of char. Further, there is no clogging trouble in the pipes.

(4) Since the quantity of heat held by the fluidized medium which is returned from the combustion furnace to the gasification furnace can be effectively utilized as a heat source for gasification in the gasification furnace, the amount of air supplied to the gasification furnace can be reduced, the gasification efficiency is increased, and the heating value of gas per unit volume can be increased.

(5) The distribution of fuel can be performed well in the gasification furnace. That is, due to the revolving flow in the fluidized-bed of the gasification furnace, fuel is swallowed quickly and retention time of fuel in the bed can be prolonged. Further, fuel can be gasified by partial combustion uniformly because the fuel can be well distributed and well mixed, and the number of fuel supplying ports can be reduced.

(6) Even fuel containing incombustible material can be utilized.

(7) higher than an atmospheric pressure, higher efficiency can be obtained. That is, in the conventional pressurized fluidized-bed boiler, the gas temperature at the inlet of the gas turbine is in the range of 850 to 900° C. However, in the present invention, coal is gasified by partial combustion in the gasification furnace, the remaining combustible component is completely combusted in the combustion furnace, and the produced gas and the combustion exhaust gas discharged from the respective furnaces are introduced into the gas turbine. Therefore, the temperature of combustion gas at the inlet of the gas turbine can be increased to a temperature of 1300° C. or higher, and hence the power delivering efficiency is greatly increased in the range of 42 to 46%.

(8) The combustion furnace comprises an internally circulating fluidized-bed boiler, and offers the following advantages.

1) The heat generated in the combustion furnace can be recovered at a high efficiency.

2) The load can be easily controlled not by varying the height of the fluidized-bed, but by varying the fluidizing velocity in the heat recovery chamber.

3) Since there is no need for varying the height of the fluidized-bed, a storage tank for the fluidized medium or pipes for transferring the fluidized medium are not required and thus simplifying of the facilities can be achieved.

4) The temperature of the fluidized-bed and the temperature of combustion gas can be controlled at respective constant values even when the load is changed, so that the efficiency of the gas turbine is stable.

5) Since the heat recovery chamber has a weak fluidizing region of the fluidized medium, the immersed heat transfer tubes don't suffer the effect of wearing. Hence, it is possible to use hard silica sand as a fluidized medium, and the amount of ashes discharged therefrom is decreased.

Further, in the fluidized-bed coal boiler which is a kind of fluidized-bed gasification and combustion furnace according to the present invention, even if the kind of coal is changed, the heat transfer surfaces of the boiler is not required to be changed or reconstructed.

INDUSTRIAL APPLICABILITY

The present invention can be utilized in the system for gasifying and combusting wastes including municipal wastes and industrial wastes, or solid fuel such as coal.

The invention claimed is:

1. A gasification and combustion method using a gasification furnace having a furnace bottom located at a lower part thereof, a combustion furnace having a furnace bottom located at a lower part thereof, and a partition wall for separating said gasification furnace and said combustion furnace from each other, said gasification and combustion method comprising:

ejecting a fluidizing gas from said furnace bottom of said gasification furnace so as to have a substantially low fluidizing velocity to form a weak fluidizing region in a fluidized bed of said gasification furnace adjacent to said partition wall;

ejecting a fluidizing gas from said furnace bottom of said gasification furnace so as to have a substantially high fluidizing velocity to form an intense fluidizing region in said fluidized bed of said gasification furnace;

supplying a combustible material containing an incombustible material to said weak fluidizing region of said gasification furnace;

gasifying said combustible material in said gasification furnace to produce a produced gas and char;

ejecting a fluidizing gas from said furnace bottom of said combustion furnace so as to have a substantially high fluidizing velocity to form an intense fluidizing region in a fluidized bed of said combustion furnace adjacent to said partition wall;

introducing a fluidized medium containing said char from said gasification furnace into said combustion furnace through a lower opening provided in said partition wall;

discharging said incombustible material through an incombustible material discharging port provided between said furnace bottom of said gasification furnace and said furnace bottom of said combustion furnace;

ejecting a fluidizing gas from said furnace bottom of said combustion furnace so as to have a substantially low fluidizing velocity to form a weak fluidizing region in said fluidized bed of said combustion furnace; and combusting said char introduced in said combustion furnace.

2. The gasification and combustion method as recited in claim 1, wherein the fluidizing gas ejected from said furnace bottom of said gasification furnace comprises any one of air, stream, oxygen and combustion exhaust gas, or a mixture of at least two of them.

3. The gasification and combustion method as recited in claim 1, wherein said furnace bottom is inclined downwardly toward said incombustible material discharging port.

4. The gasification and combustion method as recited in claim 1, wherein said combustible material comprises at least one of municipal wastes, industrial wastes, and solid fuel.

5. The gasification and combustion method as recited in claim 1, wherein said combustible gas from said furnace bottom of said gasification furnace so as to have a substantially low fluidizing velocity, said ejection a fluidizing gas from said furnace bottom of said gasification furnace so as to have a substantially high fluidizing velocity, said ejecting a fluidizing gas from said furnace bottom of said combustion furnace so as to have a substantially high fluidizing velocity, and said ejecting a fluidizing gas from said furnace bottom of said combustion furnace so as to have a substantially low fluidizing velocity are performed simultaneously.

* * * * *

UNITED STATES PATENT AND TRADEMARK OFFICE
CERTIFICATE OF CORRECTION

PATENT NO.        : 7,285,144 B2  
APPLICATION NO.   : 11/210798  
DATED             : October 23, 2007  
INVENTOR(S)       : Shuichi Nagato et al.

Page 1 of 1

It is certified that error appears in the above-identified patent and that said Letters Patent is hereby corrected as shown below:

Col. 38 line 38  
In claim 5, line 2, "wherein said combustible gas" should be --wherein said ejecting a fluidizing gas--.

Signed and Sealed this

Twenty-fifth Day of March, 2008

JON W. DUDAS  
*Director of the United States Patent and Trademark Office*